US011714432B2

(12) United States Patent
Lyon et al.

(10) Patent No.: US 11,714,432 B2
(45) Date of Patent: *Aug. 1, 2023

(54) FLOW-PATH CONTROLLERS AND RELATED SYSTEMS

(71) Applicant: CoolIT Systems, Inc., Calgary (CA)

(72) Inventors: Geoff Sean Lyon, Calgary (CA); Mike Holden, Calgary (CA)

(73) Assignee: CoolIT Systems, Inc., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/525,303

(22) Filed: Jul. 29, 2019

(65) Prior Publication Data

US 2019/0354121 A1 Nov. 21, 2019

Related U.S. Application Data

(63) Continuation of application No. 15/354,982, filed on Nov. 17, 2016, now Pat. No. 10,365,667, which is a continuation-in-part of application No. 14/777,510, filed as application No. PCT/IB2014/059768 on Mar. 14, 2014, now Pat. No. 10,364,809.

(60) Provisional application No. 62/256,519, filed on Nov. 17, 2015, provisional application No. 61/880,081, filed on Sep. 19, 2013, provisional application No.
(Continued)

(51) Int. Cl.
*G05D 7/06* (2006.01)
*G06F 1/20* (2006.01)

(52) U.S. Cl.
CPC .......... *G05D 7/0635* (2013.01); *G06F 1/206* (2013.01); *G06F 2200/201* (2013.01)

(58) Field of Classification Search
CPC ......... G05B 17/02; F04B 49/065; G06F 1/20; G06F 1/206; G06F 2200/201; G01F 1/103; G01M 3/2807; G01M 3/18; G05D 7/0635

See application file for complete search history.

(56) References Cited

U.S. PATENT DOCUMENTS 3,073,385 A 1/1963 Peters
3,481,393 A 12/1969 Chu
(Continued)

FOREIGN PATENT DOCUMENTS

CN 102483242 A 5/2012
DE 20 2012 002 974 U1 7/2012
(Continued)

OTHER PUBLICATIONS

Ellsworth, M.J. Jr. et al., "The Evolution of Water Cooling for IBM Large Server Systems: Back to the Future," IEEE, CoolIT Systems Inc. Exhibit 1017, pp. 1-9, (2008).
(Continued)

*Primary Examiner* — Vincent H Tran
(74) *Attorney, Agent, or Firm* — Ganz Pollard, LLC

(57) ABSTRACT

An observed operational state can include an operational state of one or more system devices. A sensor can emit, in response to a detected observable condition reflective of a given operational state, a simulated signal reflective of a different operational state as a proxy for the detected condition. A controller receiving such a proxy signal can, at least partially responsively to the proxy signal, issue a command corresponding to the given operational state. An electromechanical actuator can be selectively activatable responsive to the command.

13 Claims, 17 Drawing Sheets

Related U.S. Application Data

61/856,566, filed on Jul. 19, 2013, provisional application No. 61/805,418, filed on Mar. 26, 2013, provisional application No. 61/793,479, filed on Mar. 15, 2013.

(56) References Cited

U.S. PATENT DOCUMENTS

| | | |
|---|---|---|
| 3,939,328 A | 2/1976 | Davis |
| 4,340,111 A | 7/1982 | Skala |
| 4,450,472 A | 5/1984 | Tuckerman et al. |
| 4,520,298 A | 5/1985 | Abbondanti |
| 4,561,040 A | 12/1985 | Eastman et al. |
| 4,564,040 A | 1/1986 | Rudelick |
| 4,750,086 A | 6/1988 | Mittal |
| 4,758,926 A | 7/1988 | Herrell et al. |
| 4,768,581 A | 9/1988 | Gotwald et al. |
| 4,777,578 A | 10/1988 | Jahns |
| 4,898,153 A | 2/1990 | Sherwood |
| 4,909,315 A | 3/1990 | Nelson et al. |
| 4,940,085 A | 7/1990 | Nelson et al. |
| 5,016,090 A | 5/1991 | Galyon et al. |
| 5,070,936 A | 12/1991 | Carroll et al. |
| 5,099,311 A | 3/1992 | Bonde et al. |
| 5,142,214 A | 8/1992 | Purson et al. |
| 5,203,401 A | 4/1993 | Hamburgen et al. |
| 5,218,515 A | 6/1993 | Bernhardt |
| 5,265,670 A | 11/1993 | Zingher |
| 5,294,830 A | 3/1994 | Young et al. |
| 5,309,319 A | 5/1994 | Messina |
| 5,441,102 A | 8/1995 | Burward-Hoy |
| 5,453,641 A | 9/1995 | Mundinger et al. |
| 5,522,452 A | 6/1996 | Mizuno et al. |
| 5,535,818 A | 7/1996 | Fujisaki et al. |
| 5,592,363 A | 1/1997 | Atarashi et al. |
| 5,628,199 A | 5/1997 | Hoglund et al. |
| 5,636,653 A | 6/1997 | Titus |
| 5,646,824 A | 7/1997 | Ohashi et al. |
| 5,684,671 A | 11/1997 | Hobbs et al. |
| 5,727,618 A | 3/1998 | Mundinger et al. |
| 5,731,954 A | 3/1998 | Cheon |
| 5,823,249 A | 10/1998 | Batchelder |
| 5,835,347 A | 11/1998 | Chu |
| 5,864,464 A | 1/1999 | Lin |
| 5,875,637 A | 3/1999 | Paetow |
| 5,998,240 A | 12/1999 | Hamilton et al. |
| 6,019,165 A | 2/2000 | Batchelder |
| 6,035,655 A | 3/2000 | Hare et al. |
| 6,256,378 B1 | 7/2001 | Iggulden et al. |
| 6,327,145 B1 | 12/2001 | Lian et al. |
| 6,330,525 B1 | 12/2001 | Hays et al. |
| 6,361,287 B1 | 3/2002 | Hopper |
| 6,415,853 B1 | 7/2002 | Tao et al. |
| 6,415,860 B1 | 7/2002 | Kelly et al. |
| 6,447,270 B1 | 9/2002 | Schmidt et al. |
| 6,470,289 B1 | 10/2002 | Peters et al. |
| 6,679,315 B2 | 1/2004 | Cosley et al. |
| 6,702,002 B2 | 3/2004 | Wang |
| 6,769,258 B2 | 8/2004 | Pierson |
| 6,775,137 B2 | 8/2004 | Chu et al. |
| 6,792,373 B2 | 9/2004 | Tabor |
| 6,819,563 B1 | 11/2004 | Chu et al. |
| 6,827,128 B2 | 12/2004 | Philpott et al. |
| 6,883,347 B2 | 4/2005 | Ayub |
| 6,952,345 B2 | 10/2005 | Weber et al. |
| 6,970,355 B2 | 11/2005 | Ellsworth, Jr. et al. |
| 6,973,801 B1 | 12/2005 | Campbell et al. |
| 6,986,382 B2 | 1/2006 | Upadhya et al. |
| 6,988,534 B2 | 1/2006 | Kenny et al. |
| 6,993,421 B2 | 1/2006 | Pillar et al. |
| 7,000,684 B2 | 2/2006 | Kenny et al. |
| 7,007,506 B2 | 3/2006 | Kubo et al. |
| 7,012,807 B2 | 3/2006 | Chu et al. |
| 7,021,367 B2 | 4/2006 | Oikawa |
| 7,029,647 B2 | 4/2006 | Tonkovich et al. |
| 7,032,651 B2 | 4/2006 | Winslow et al. |
| 7,044,198 B2 | 5/2006 | Matsushima et al. |
| 7,057,893 B2 | 6/2006 | Nicolai et al. |
| 7,086,247 B2 | 8/2006 | Campbell et al. |
| 7,104,312 B2 | 9/2006 | Goodson et al. |
| 7,123,996 B2 | 10/2006 | Fukushima et al. |
| 7,124,811 B2 | 10/2006 | Crocker et al. |
| 7,131,486 B2 | 11/2006 | Goodson et al. |
| 7,143,816 B1 | 12/2006 | Ghosh et al. |
| 7,149,084 B2 | 12/2006 | Matsushima et al. |
| 7,156,159 B2 | 1/2007 | Lovette et al. |
| 7,190,580 B2 | 3/2007 | Bezama et al. |
| 7,201,217 B2 | 4/2007 | Johnson et al. |
| 7,206,203 B2 | 4/2007 | Campbell et al. |
| 7,209,355 B2 | 4/2007 | Koga et al. |
| 7,221,270 B2 | 5/2007 | Chen et al. |
| 7,264,359 B2 | 9/2007 | Kawahara et al. |
| 7,274,566 B2 | 9/2007 | Campbell et al. |
| 7,278,273 B1 | 10/2007 | Whitted et al. |
| 7,301,771 B2 | 11/2007 | Hata et al. |
| 7,315,448 B1 | 1/2008 | Bash et al. |
| 7,318,322 B2 | 1/2008 | Ota et al. |
| 7,331,378 B2 | 2/2008 | Bhatti et al. |
| 7,360,582 B2 | 4/2008 | Olesen |
| 7,397,661 B2 | 7/2008 | Campbell et al. |
| 7,405,935 B1 | 7/2008 | Carey |
| 7,436,666 B1 | 10/2008 | Konshak |
| 7,455,103 B2 | 11/2008 | Sato et al. |
| 7,466,549 B2 | 12/2008 | Dorrich et al. |
| 7,466,553 B2 | 12/2008 | Hamman |
| 7,484,530 B2 | 2/2009 | Harvey et al. |
| 7,486,513 B2 | 2/2009 | Hall et al. |
| 7,527,085 B2 | 5/2009 | Iijima et al. |
| 7,591,302 B1 | 9/2009 | Lenehan et al. |
| 7,599,184 B2 | 10/2009 | Upadhya et al. |
| 7,639,499 B1 | 12/2009 | Campbell et al. |
| 7,688,589 B2 | 3/2010 | Chiang |
| 7,757,506 B2 | 7/2010 | Ellsworth, Jr. et al. |
| 7,762,314 B2 | 7/2010 | Campbell et al. |
| 7,791,882 B2 | 9/2010 | Chu et al. |
| 7,806,168 B2 | 10/2010 | Upadhya et al. |
| 7,905,106 B2 | 3/2011 | Attlesey |
| 7,925,746 B1 | 4/2011 | Melton |
| 7,944,694 B2 | 5/2011 | Campbell et al. |
| 7,957,144 B2 | 6/2011 | Goettert et al. |
| 7,961,465 B2 | 6/2011 | Goldrian et al. |
| 7,969,727 B2 | 6/2011 | Tozer et al. |
| 7,971,632 B2 | 7/2011 | Eriksen |
| 7,978,472 B2 | 7/2011 | Campbell et al. |
| 8,051,898 B2 | 11/2011 | Chiang |
| 8,066,057 B2 | 11/2011 | Olesen |
| 8,240,362 B2 | 8/2012 | Eriksen |
| 8,245,764 B2 | 8/2012 | Eriksen |
| 8,250,879 B2 | 8/2012 | MacBain et al. |
| 8,427,831 B2 | 4/2013 | Wei |
| 8,437,129 B2 | 5/2013 | Tung et al. |
| 8,441,789 B2 | 5/2013 | Wu et al. |
| 8,493,735 B2 | 7/2013 | Iijima |
| 8,493,738 B2 | 7/2013 | Chainer et al. |
| 8,499,761 B2 | 8/2013 | Jorczak et al. |
| 8,631,860 B2 | 1/2014 | Tang et al. |
| 8,687,364 B2 * | 4/2014 | Chainer ............ H05K 7/20781 |
| | | 361/694 |
| 8,724,315 B2 | 5/2014 | Branton |
| 8,746,330 B2 | 6/2014 | Lyon |
| 9,052,252 B2 * | 6/2015 | Lyon ................. G01M 3/18 |
| 9,057,567 B2 | 6/2015 | Lyon |
| 9,215,832 B2 | 12/2015 | Chang et al. |
| 9,453,691 B2 | 9/2016 | Lyon |
| 9,496,200 B2 | 11/2016 | Lyon et al. |
| 9,603,284 B2 | 3/2017 | Lyon |
| 9,723,745 B2 | 8/2017 | Qi et al. |
| 10,335,230 B2 * | 7/2019 | Willyard ............ A61B 18/1815 |
| 10,364,809 B2 * | 7/2019 | Lyon ................. G01M 3/2807 |
| 10,365,667 B2 * | 7/2019 | Lyon ................. G06F 1/206 |
| 2002/0070007 A1 | 6/2002 | Calaman et al. |
| 2002/0153885 A1 | 10/2002 | Blossfeld |
| 2002/0189790 A1 | 12/2002 | Wong |
| 2003/0019234 A1 | 1/2003 | Wayburn et al. |

(56) References Cited

U.S. PATENT DOCUMENTS

| | | |
|---|---|---|
| 2003/0070792 A1 | 4/2003 | Tanaka et al. |
| 2003/0085028 A1 | 5/2003 | Galtz |
| 2003/0151130 A1 | 8/2003 | Cheon |
| 2003/0230400 A1 | 12/2003 | McCordic et al. |
| 2004/0008483 A1 | 1/2004 | Cheon |
| 2004/0016241 A1 | 1/2004 | Street et al. |
| 2004/0040695 A1 | 3/2004 | Chesser et al. |
| 2004/0042171 A1 | 3/2004 | Takamatsu et al. |
| 2004/0042172 A1 | 3/2004 | Kusaka et al. |
| 2004/0057211 A1 | 3/2004 | Kondo et al. |
| 2004/0100770 A1 | 5/2004 | Chu et al. |
| 2004/0104010 A1 | 6/2004 | Kenny et al. |
| 2004/0104012 A1 | 6/2004 | Zhou et al. |
| 2004/0104022 A1 | 6/2004 | Kenny et al. |
| 2004/0112585 A1 | 6/2004 | Goodson et al. |
| 2004/0123614 A1 | 7/2004 | Stewart |
| 2004/0160741 A1 | 8/2004 | Moss et al. |
| 2004/0182548 A1 | 9/2004 | Lovette et al. |
| 2004/0182560 A1 | 9/2004 | Kenny et al. |
| 2004/0188066 A1 | 9/2004 | Upadhya et al. |
| 2004/0188069 A1 | 9/2004 | Tomioka et al. |
| 2004/0206477 A1 | 10/2004 | Kenny et al. |
| 2004/0221604 A1 | 11/2004 | Ota et al. |
| 2004/0240179 A1 | 12/2004 | Koga et al. |
| 2005/0069432 A1 | 3/2005 | Tomioka |
| 2005/0111187 A1 | 5/2005 | Berens et al. |
| 2005/0126747 A1 | 6/2005 | Chu et al. |
| 2005/0128705 A1 | 6/2005 | Chu et al. |
| 2005/0178531 A1 | 8/2005 | Huang et al. |
| 2005/0180107 A1 | 8/2005 | Naganawa et al. |
| 2005/0205241 A1 | 9/2005 | Goodson et al. |
| 2005/0211417 A1 | 9/2005 | Upadhya et al. |
| 2005/0241809 A1 | 11/2005 | Tomioka et al. |
| 2005/0259397 A1 | 11/2005 | Bash et al. |
| 2005/0269061 A1 | 12/2005 | Brewer et al. |
| 2006/0002080 A1 | 1/2006 | Leija et al. |
| 2006/0002088 A1 | 1/2006 | Bezama et al. |
| 2006/0011329 A1 | 1/2006 | Wang et al. |
| 2006/0094347 A1 | 5/2006 | Tracy et al. |
| 2006/0096738 A1 | 5/2006 | Kang et al. |
| 2006/0096740 A1 | 5/2006 | Zheng |
| 2006/0096743 A1 | 5/2006 | Lee et al. |
| 2006/0137863 A1 | 6/2006 | Lee et al. |
| 2006/0143439 A1 | 6/2006 | Arumugam et al. |
| 2006/0162903 A1 | 7/2006 | Bhatti et al. |
| 2006/0171801 A1 | 8/2006 | Manabe et al. |
| 2006/0185829 A1 | 8/2006 | Duan et al. |
| 2006/0185830 A1 | 8/2006 | Duan |
| 2006/0187638 A1 | 8/2006 | Vinson et al. |
| 2006/0225867 A1 | 10/2006 | Park et al. |
| 2006/0231238 A1 | 10/2006 | Ball, Jr. |
| 2006/0254755 A1 | 11/2006 | Chen et al. |
| 2007/0029069 A1 | 2/2007 | Duan |
| 2007/0034356 A1 | 2/2007 | Kenny et al. |
| 2007/0039719 A1 | 2/2007 | Eriksen |
| 2007/0095512 A1 | 5/2007 | Chen et al. |
| 2007/0107886 A1 | 5/2007 | Chen |
| 2007/0125526 A1 | 6/2007 | Satou et al. |
| 2007/0131396 A1 | 6/2007 | Yu et al. |
| 2007/0163750 A1 | 7/2007 | Bhatti et al. |
| 2007/0193724 A1 | 8/2007 | Lin |
| 2007/0227704 A1 | 10/2007 | Nagai et al. |
| 2007/0227710 A1 | 10/2007 | Belady et al. |
| 2007/0256957 A1 | 11/2007 | Herrmann et al. |
| 2007/0272314 A1 | 11/2007 | Packham |
| 2007/0272392 A1 | 11/2007 | Ghosh et al. |
| 2007/0297136 A1 | 12/2007 | Konshak |
| 2008/0041792 A1* | 2/2008 | Crnkovich ............ A61F 13/42 210/739 |
| 2008/0053641 A1 | 3/2008 | Lai et al. |
| 2008/0128114 A1 | 6/2008 | Lai et al. |
| 2008/0165499 A1* | 7/2008 | Campbell ............ H05K 7/2079 361/699 |
| 2008/0179045 A1 | 7/2008 | Hu et al. |
| 2008/0205003 A1 | 8/2008 | Belady |
| 2008/0225478 A1 | 9/2008 | Goettert et al. |
| 2008/0266726 A1 | 10/2008 | Murakami et al. |
| 2008/0288124 A1* | 11/2008 | Huang .................... G06F 1/206 700/300 |
| 2008/0301941 A1 | 12/2008 | Anderson, Jr. et al. |
| 2008/0304236 A1 | 12/2008 | Murakami et al. |
| 2008/0314367 A1* | 12/2008 | Goulette ................ F02D 41/20 123/472 |
| 2009/0071625 A1 | 3/2009 | Lyon |
| 2009/0101315 A1 | 4/2009 | Cheng |
| 2009/0120622 A1 | 5/2009 | Koch |
| 2009/0139698 A1 | 6/2009 | Robinson |
| 2009/0154096 A1 | 6/2009 | Iyengar et al. |
| 2009/0228893 A1 | 9/2009 | Behrendt et al. |
| 2009/0306833 A1 | 12/2009 | Vinson et al. |
| 2009/0322543 A1 | 12/2009 | Crnkovich et al. |
| 2010/0012294 A1 | 1/2010 | Bezama et al. |
| 2010/0032142 A1 | 2/2010 | Copeland et al. |
| 2010/0065355 A1 | 3/2010 | Reddy |
| 2010/0085708 A1 | 4/2010 | Martin et al. |
| 2010/0101765 A1 | 4/2010 | Campbell et al. |
| 2010/0103620 A1 | 4/2010 | Campbell et al. |
| 2010/0139887 A1 | 6/2010 | Slessman |
| 2010/0179695 A1 | 7/2010 | Collins et al. |
| 2010/0182809 A1 | 7/2010 | Cullinane et al. |
| 2010/0206869 A1 | 8/2010 | Nelson et al. |
| 2010/0211669 A1 | 8/2010 | Dalgas et al. |
| 2010/0324962 A1 | 12/2010 | Nesler et al. |
| 2010/0326634 A1 | 12/2010 | Eriksen |
| 2011/0084839 A1 | 4/2011 | Groth et al. |
| 2011/0100045 A1 | 5/2011 | Carlson |
| 2011/0100618 A1 | 5/2011 | Carlson |
| 2011/0115223 A1 | 5/2011 | Stahlkopf et al. |
| 2011/0127027 A1 | 6/2011 | Kashirajima et al. |
| 2011/0154842 A1 | 6/2011 | Heydari et al. |
| 2011/0168379 A1 | 7/2011 | Morgan et al. |
| 2011/0174001 A1 | 7/2011 | Carlson et al. |
| 2011/0175498 A1 | 7/2011 | Bash et al. |
| 2011/0303394 A1 | 12/2011 | Branton |
| 2011/0313576 A1* | 12/2011 | Nicewonger ............ F28D 15/00 700/282 |
| 2011/0317367 A1 | 12/2011 | Campbell et al. |
| 2012/0103009 A1 | 5/2012 | Ding et al. |
| 2012/0147553 A1 | 6/2012 | Eriksen |
| 2012/0152498 A1 | 6/2012 | Lyon |
| 2012/0175094 A1 | 7/2012 | Rice |
| 2012/0176745 A1* | 7/2012 | Heiberg ................. G06F 1/203 361/679.47 |
| 2012/0186790 A1 | 7/2012 | Delia et al. |
| 2012/0271567 A1 | 10/2012 | Da Pont et al. |
| 2012/0273159 A1 | 11/2012 | Eriksen |
| 2013/0025818 A1 | 1/2013 | Lyon et al. |
| 2013/0107453 A1 | 5/2013 | Chainer et al. |
| 2013/0184927 A1* | 7/2013 | Daniel ..................... E02F 3/46 701/29.1 |
| 2013/0203032 A1* | 8/2013 | Bardsley ................ G09B 23/34 434/268 |
| 2013/0277008 A1* | 10/2013 | Ishikura ............... G01M 3/2853 165/200 |
| 2013/0288630 A1* | 10/2013 | Suzuki ................ H04L 27/2332 455/232.1 |
| 2013/0340995 A1 | 12/2013 | David et al. |
| 2014/0069111 A1* | 3/2014 | Campbell ................ F25B 21/02 62/3.2 |
| 2014/0103950 A1 | 4/2014 | Janitch |
| 2014/0126147 A1* | 5/2014 | Chen ....................... G06F 1/206 361/695 |
| 2014/0147289 A1* | 5/2014 | Tian ...................... F04D 27/008 417/45 |
| 2014/0158326 A1 | 6/2014 | Lyon |
| 2014/0186156 A1* | 7/2014 | Lai ........................ F04D 27/004 415/30 |
| 2014/0245708 A1* | 9/2014 | Kawabe ................ B01D 46/2414 55/492 |
| 2014/0251582 A1 | 9/2014 | Lyon |
| 2014/0262180 A1 | 9/2014 | Lyon et al. |
| 2014/0266744 A1 | 9/2014 | Lyon et al. |
| 2014/0332195 A1 | 11/2014 | Liverman |

(56) References Cited

U.S. PATENT DOCUMENTS

| | | |
|---|---|---|
| 2015/0083368 A1 | 3/2015 | Lyon |
| 2015/0108934 A1 | 4/2015 | Wong et al. |
| 2015/0166362 A1 | 6/2015 | Govindan et al. |
| 2015/0168474 A1 | 6/2015 | Yoshioka et al. |
| 2015/0176931 A1 | 6/2015 | Aeberhard et al. |
| 2015/0355630 A1* | 12/2015 | Cader ............... G05B 19/408 700/9 |
| 2016/0281704 A1 | 9/2016 | Lyon et al. |
| 2016/0290216 A1 | 10/2016 | Katragadda et al. |
| 2016/0377355 A1 | 12/2016 | Lyon |
| 2017/0030228 A1 | 2/2017 | Jordan, Jr. et al. |
| 2017/0064874 A1 | 3/2017 | Lyon et al. |
| 2017/0196116 A1 | 7/2017 | Lyon |
| 2019/0039437 A1 | 2/2019 | Jentz et al. |
| 2019/0116694 A1 | 4/2019 | Lyon et al. |
| 2019/0353370 A1 | 11/2019 | Hern et al. |
| 2019/0354121 A1* | 11/2019 | Lyon ............... G05D 7/0635 |

FOREIGN PATENT DOCUMENTS

| | | |
|---|---|---|
| EP | 1 808 892 A2 | 7/2007 |
| JP | 61-32449 A | 2/1986 |
| JP | 06-120387 A | 4/1994 |
| JP | 7-183678 A | 7/1995 |
| JP | 09292099 A * | 11/1997 |
| JP | 10-173114 A | 6/1998 |
| JP | 2001-255027 A | 9/2001 |
| JP | 2002-151638 A | 5/2002 |
| JP | 2003-243581 A | 8/2003 |
| JP | 2005-351600 A | 12/2005 |
| JP | 2007-180505 A | 7/2007 |
| JP | 2007-227902 A | 9/2007 |
| JP | 2007-531991 A | 11/2007 |
| JP | 2008-140879 A | 6/2008 |
| JP | 2009-529621 A | 8/2009 |
| JP | 2011-114206 A | 6/2011 |
| JP | 3179086 U | 10/2012 |
| TW | M273031 U | 8/2005 |
| TW | M298733 U | 10/2006 |
| TW | I266039 B | 11/2006 |
| TW | 201305522 A1 | 2/2013 |
| TW | 201320883 A | 5/2013 |
| TW | 201441626 A | 11/2014 |
| TW | M587771 | 12/2019 |
| WO | 01/65900 A1 | 9/2001 |
| WO | 03/055055 A1 | 7/2003 |
| WO | 2005/017468 A2 | 2/2005 |
| WO | 2005/096377 A1 | 10/2005 |
| WO | 2006/052317 A2 | 5/2006 |
| WO | 2007/029253 A2 | 3/2007 |
| WO | 2014/141162 A1 | 9/2014 |

OTHER PUBLICATIONS

Ellsworth, M.J. Jr. P.E., "Thermal Design and Implementation of Robust Liquid Cooling Systems for High Performance Computer Systems," Systems and Technology Group, IBM, InterPACK '11, dated Jul. 6-8, 2011, pp. 1-64.

Kandlikar, S.G., "High Flux Heat Removal with Microchannels. A Roadmap of Challenges and Opportunities," Heat Transfer Engineering. vol. 26 No. 8 : 5-14, (2005), pp. 5-14.

Knight, R.W., et al., "Heat Sink Optimization with Application to Microchannels," IEEE Transactions on Components, Hybrids, and Manufacturing Technology, vol. 15, No. 5, Oct. 1992, pp. 832-842.

Merriam-webster definition of beveled, dated Jan. 26, 2016, retrieved from internet URL: http://www.merriam-webster.com/dictionary/beveled, pp. 1-4.

Schmidt, R.R., "Liquid Cooling is Back," Electronics Cooling Magazine, Published Aug. 1, 2005, Retrieved from the Internet URL: https://www.electronics-cooling.com/2005/08/liquid-cooling-is-back/, on Apr. 30, 2014, pp. 1-7.

Steinke, M., and Kandlikar, S.G., "Single-Phase Heat Transfer Enhancement Techniques In Microchannel and Minichannels Flows," Microchannels and Minichannels—2004, published on Jun. 17-19, 2004, Rochaster, New York, pp. 1-8.

Torres, G., "CoolIT Water-Cooling Products," Published Jan. 14, 2008, Retrieved from Internet URL: http://www.hardwaresecrets.com/coolit-water-cooling-products/3/, on Apr. 24, 2014, pp. 1-9.

Vertal, L., "Water Cooling Comes of Age, Again," Asetek Data Center Liquid Cooling, Published on Oct. 11, 2013, Retrieved from the Internet URL: htt5s://www.asetek.com/press-room/blog/2013/water-cooling-comes-of-age-again/, on Nov. 9, 2015, pp. 1-4.

Examination Report in European Patent Application No. 07075014.6, dated Mar. 11, 2011.

Requirement Restriction for U.S. Appl. No. 12/189,476, dated Jan. 24, 2012.

Non-Final Office Action for U.S. Appl. No. 12/189,476, dated Apr. 13, 2012.

English translation of Office Action for Japanese Application No. 2012-002117, dated May 7, 2012.

Final Office Action for U.S. Appl. No. 12/189,476, dated Jan. 7, 2013.

English translation of Technical Opinion for Japanese Utility Model Application No. 2012-002117, dated Jan. 10, 2013 (Registration No. 3179086).

English translation of Second Technical Opinion for Japanese Utility Model Application No. 2012-002117 dated Jul. 19, 2013 (Registration No. 3179086).

English translation of Chinese-language Search and Examination Reports for Taiwan Patent Application No. 101110072 dated Apr. 9, 2014.

Notice of Allowance for U.S. Appl. No. 12/189,476, dated Apr. 28, 2014.

Restriction Requirement for U.S. Appl. No. 14/183,443, dated May 22, 2014.

Restriction Requirement for U.S. Appl. No. 14/210,165, dated Jun. 12, 2014.

Restriction Requirement for U.S. Appl. No. 14/283,163, dated Jun. 13, 2014.

International Search Report and Written Opinion for PCT Application No. PCT/IB2014/059768, dated Jul. 9, 2014.

Petition for Inter Partes Review of U.S. Pat. No. 8,749,968; United States Patent and Trademark Office, Before the 5 Patent Trial and Appeal Board, *CoolIT Systems, Inc.* v. *Asetek A/S*, Inter Partes Review No. 2014-01172, Jul. 16, 2014; 61 pages.

Requirement Restriction for U.S. Appl. No. 13/401,618, dated Sep. 18, 2014.

Non-Final Office Action for U.S. Appl. No. 14/210,165, dated Sep. 29, 2014.

Non-Final Office Action for U.S. Appl. No. 14/283,163, dated Sep. 30, 2014.

Non-Final Office Action for U.S. Appl. No. 14/183,443, dated Oct. 30, 2014.

Restriction Requirement for U.S. Appl. No. 13/559,340, dated Oct. 31, 2014.

English Translation of Examination and Search Report for Taiwan Application No. 103109612, dated Jan. 1, 2015.

Third Party Preissuance Submission for U.S. Appl. No. 13/559,340, dated Jan. 9, 2015.

Preissuance Submission for U.S. Appl. No. 13/401,618, dated Jan. 9, 2015.

Ex Parte Quayle Action for U.S. Appl. No. 14/210,165, dated Feb. 5, 2015.

Restriction Requirement for U.S. Appl. No. 14/550,952, dated Feb. 5, 2015.

Notice of Allowance for U.S. Appl. No. 14/210,165, dated Feb. 20, 2015.

Non-Final Office Action for U.S. Appl. No. 13/559,340, dated Mar. 26, 2015.

Notice of Allowance for U.S. Appl. No. 14/183,443, dated Apr. 30, 2015.

Final Office Action for U.S. Appl. No. 14/283,163, dated May 14, 2015.

English Translation of Examination and Search Report for Taiwan Application No. 101127180, dated May 21, 2015.

(56) References Cited

OTHER PUBLICATIONS

Petition for Inter Parties Review of U.S. Pat. No. 8,746,330 in *Asetek Danmark A/S* v. *CoolIT Systems Inc.* filed May 27, 2015.
Declaration of Dr. Donald Tilton (including his CV) from Petition for Inter Parties Review of U.S. Pat. No. 8,746,330 in *Asetek Danmark A/S* v. *CoolIT Systems Inc.* dated May 27, 2015.
Non-Final Office Action for U.S. Appl. No. 14/550,952, dated Jul. 7, 2015.
Non-Final Office Action for U.S. Appl. No. 13/401,618, dated Jul. 28, 2015.
Advisory Action for U.S. Appl. No. 14/283,163, dated Aug. 3, 2015.
Non-Final Office Action for U.S. Appl. No. 14/283,163, dated Sep. 4, 2015.
Final Office Action for U.S. Appl. No. 13/559,340, dated Sep. 8, 2015.
Office Action for Taiwan Application No. 103109612, dated Sep. 21, 2015.
Final Office Action for U.S. Appl. No. 14/550,952, dated Oct. 20, 2015.
Advisory Action for U.S. Appl. No. 13/559,340, dated Dec. 2, 2015.
Osinski, United States Patent and Trademark Office Decision of Institution of Inter Partes Review. Filed Dec. 9, 2015 in Case IPR2015-01276.
English translation of Notice of Allowance in Taiwan Application No. 103109612, dated Dec. 11, 2015.
Non-Final Office Action for U.S. Appl. No. 13/559,340, dated Jan. 15, 2016.
Final Office Action for U.S. Appl. No. 13/401,618, dated Jan. 26, 2016.
English translation of Notice of Allowance in Taiwan Application No. 101127180, dated Feb. 19, 2016.
Pollard, United States Patent and Trademark Office Patent Owner's Response. Filed Mar. 9, 2016 in Case PR2015-01276.
Final Office Action for U.S. Appl. No. 14/283,163, dated Jun. 15, 2016.
Notice of Allowance for U.S. Appl. No. 13/401,618, dated Jul. 27, 2016.
Restriction Requirement for U.S. Appl. No. 14/217,080, dated Sep. 21, 2016.
Notice of Allowance for U.S. Appl. No. 13/559,340, dated Sep. 23, 2016.
USPTO Patent Trial and Appeal Board Final Written Decision in Case IPR2015-01276 dated Dec. 8, 2016.
Notice of Allowance for U.S. Appl. No. 14/283,163, dated Jan. 19, 2017.
English translation of Examination Report in Taiwan Application No. 101110072, dated Feb. 8, 2017.
Non-Final Office Action for U.S. Appl. No. 15/263,210, dated Feb. 10, 2017.
Non-Final Office Action for U.S. Appl. No. 14/217,080, dated Mar. 9, 2017.
Non-Final Office Action for U.S. Appl. No. 15/462,753, dated May 11, 2017.
English translation of Notice of Allowance in Taiwan Application No. 101110072, dated Aug. 17, 2017.
Final Office Action for U.S. Appl. No. 15/462,753, dated Sep. 15, 2017.
Non-Final Office Action for U.S. Appl. No. 14/777,510, dated Oct. 11, 2017.
Notice of Allowance for U.S. Appl. No. 15/263,210, dated Oct. 30, 2017.
Notice of Allowance for U.S. Appl. No. 14/217,080, dated Nov. 1, 2017.
Non-Final Office Action in U.S. Appl. No. 15/351,362, dated Feb. 7, 2019, 20 pages.
Final Office Action in U.S. Appl. No. 14/777,510, dated Jul. 30, 2018, 23 pages.
Non-Final Office Action in U.S. Appl. No. 14/777,510, , dated Apr. 23, 2018, 23 pages.
Non-Final Office Action in U.S. Appl. No. 15/354,982, , dated May 8, 2018, 19 pages.
Final Office Action in U.S. Appl. No. 15/354,982, , dated Oct. 9, 2018, 9 pages.
"Electronic-Actuated Valves," Direct Industry, Available at https://www.directindustry.com/industrial-manufacturer/electrically-actuated-valve-118189.html (last visited Mar. 26, 2022).

* cited by examiner

| PIN | NAME | |
|---|---|---|
| 1 | GND | → TO/FROM PUMP |
| 2 | +12 V DC | → TO PUMP MOTOR |
| 3 | FG (SENSE) | ← TACHOMETER SIGNAL FROM PUMP |
| 4 | PWM (CONTROL) | → TO PUMP CONTROLLER |

FIG. 3

| PIN | NAME |
|---|---|
| 1 | GND |
| 2 | +12 V DC |
| 3 | FG (SENSE) | ← 129 SIMULATED TACHOMETER SIGNAL
| 4 | PWM (CONTROL) |

FIG. 7

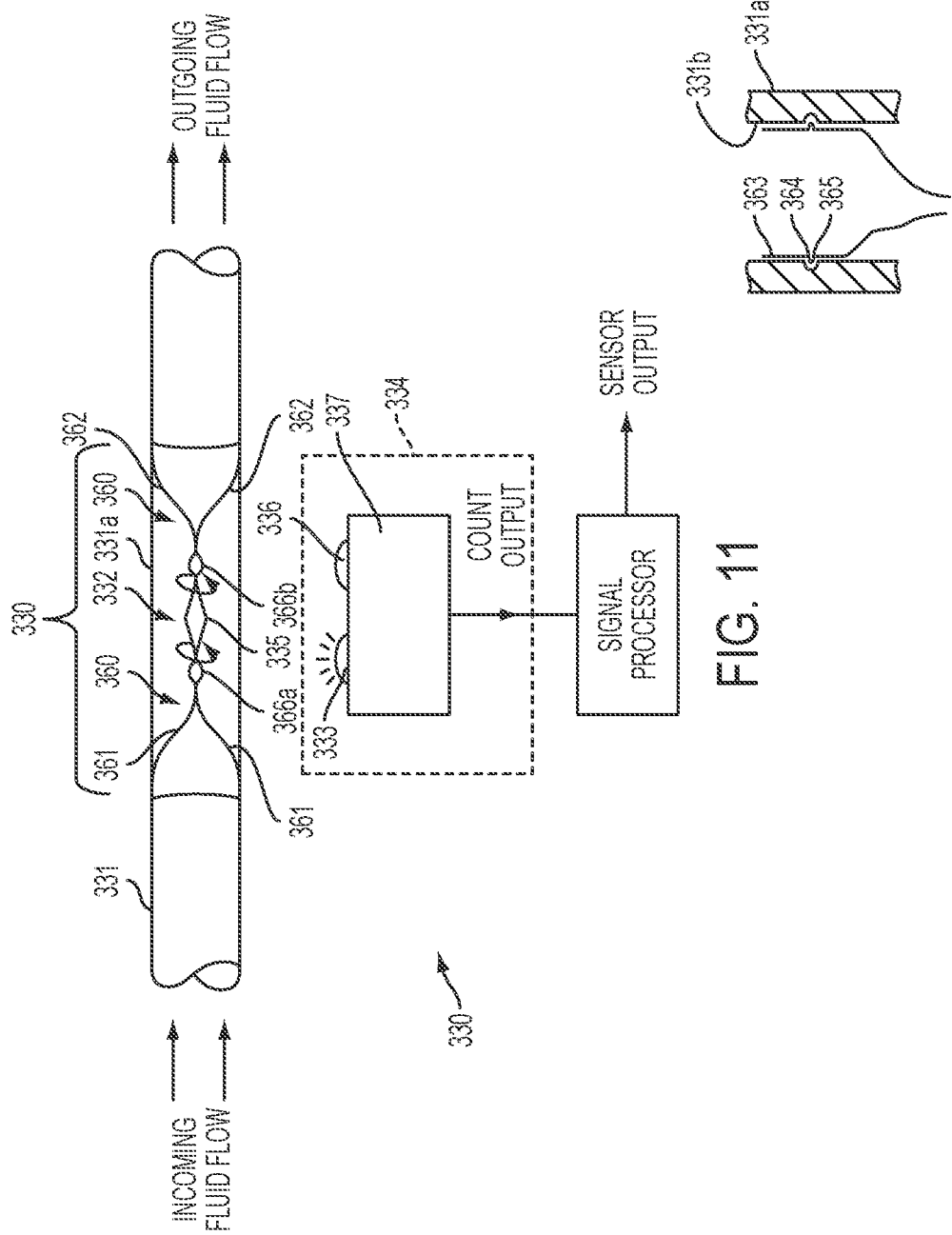

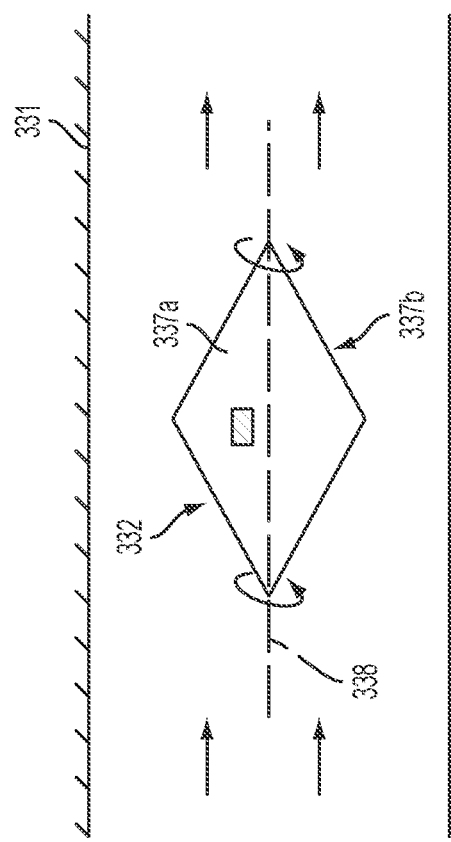
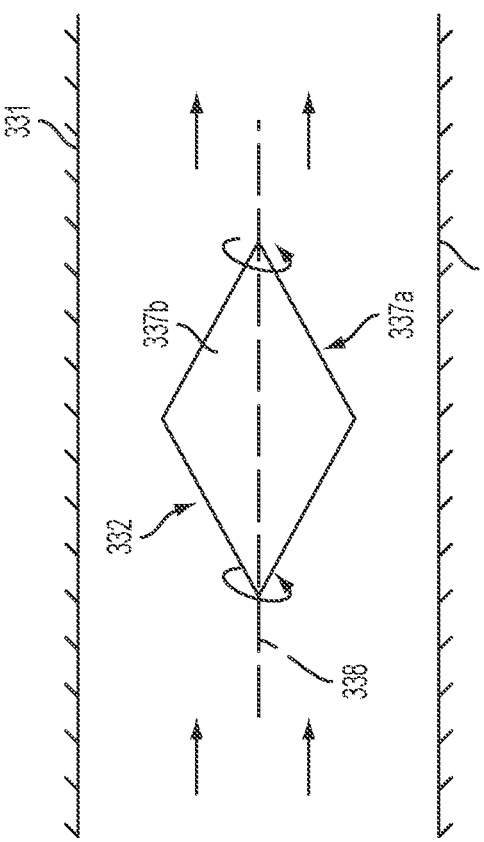
FIG. 16A
FIG. 16B

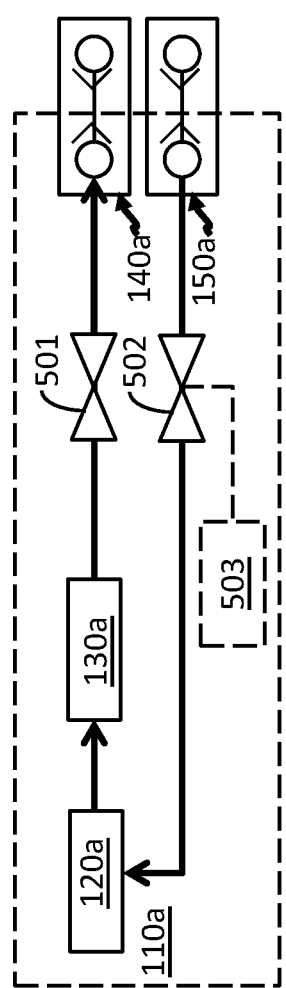

FLOW-PATH CONTROLLERS AND RELATED SYSTEMS

CROSS-REFERENCE TO RELATED APPLICATIONS

This application claims benefit of and priority to, as a continuation of, co-pending U.S. patent application Ser. No. 15/354,982, filed Nov. 17, 2016, issued as U.S. Pat. No. 10,365,667 on Jul. 30, 2019, which claims benefit of and priority to U.S. Patent Application No. 62/256,519, filed Nov. 17, 2015, and claims benefit of and priority to, as a continuation-in-part of, co-pending U.S. patent application Ser. No. 14/777,510, filed Sep. 15, 2015, issued as U.S. Pat. No. 10,364,809 on Jul. 30, 2019, which is a U.S. National Phase Application of International Patent Application No. PCT/IB2014/059768, filed Mar. 14, 2014, which claims benefit of and priority to U.S. Patent Application No. 61/793,479, filed Mar. 15, 2013, U.S. Patent Application No. 61/805,418, filed Mar. 26, 2013, U.S. Patent Application No. 61/856,566, filed Jul. 19, 2013, and U.S. Patent Application No. 61/880,081, filed Sep. 19, 2013, each of which patent applications is hereby incorporated by reference in its entirety as if fully set forth herein, for all purposes.

Other pertinent disclosures include U.S. Patent Application No. 61/522,247, filed Aug. 11, 2011, U.S. Patent Application No. 61/622,982, filed Apr. 11, 2012, U.S. Patent Application No. 61/794,698, filed Mar. 15, 2013, U.S. patent application Ser. No. 13/559,340, filed Jul. 26, 2012, now U.S. Pat. No. 9,496,200, U.S. Patent Application No. 61/908,043, filed Nov. 23, 2013, and U.S. patent application Ser. No. 14/550,952, filed Nov. 22, 2014, each of which patent applications is hereby incorporated by reference in its entirety as if fully set forth herein, for all purposes.

BACKGROUND

The innovations and related subject matter disclosed herein (collectively referred to as the "disclosure") pertain to control of fluid-flow paths in heat-transfer systems, and more particularly, but not exclusively, to electro-mechanically actuated flow-path controllers, with automatically decoupleable couplers and electro-mechanically actuated valves being but two specific examples of disclosed flow-path controllers. Such actuators can be activated responsively to an alert or a command received from a controller. Such controllers can issue the alert or command, for example, in response to a detected change in state of a given system. For example, a leak detector can be configured to respond to a detected leak of a working fluid from a liquid-based heat transfer system, or a flow-rate sensor can be configured to detect a rate of flow of a fluid through a conduit. In either instance, a controller can issue an alert or a command over a bus responsively to a detected change in state (e.g., a detected leak or a detected change in flow rate). Responsive to such an alert or a command, one or more electro-mechanical actuators, such as, for example, a linear or a rotary servo- or stepper-motor, can urge or pull against a linkage or other member arranged to terminate a fluid flow through a conduit, a channel, or other flow path. In particular examples, such an electro-mechanical actuator can cause one or more valves to open or to close, or cause a pair of matingly engaged couplers (sometimes referred to in the art as, for example, a "dripless quick-connect" or a "quick-disconnect") to decouple from each other. Some detectors and control systems are described in relation to cooling systems for electronic devices by way of example. Nonetheless, one or more of the innovations disclosed herein can be suitable for use in a variety of other control-system applications, as will be understood by those of ordinary skill in the art following a review of the present disclosure.

Computer system performance and heat dissipation density continue to increase. Consequently, conventional air-cooling is giving way to liquid-cooling in some computer system applications, including, but not exclusively, server and data center applications. Although commercially available liquid cooling systems are considered to be reliable and to provide known and repeatable performance, an automated approach for detecting an unlikely leak might be desirable in some applications. However, commercially available moisture sensors and leak detectors are not compatible with existing control systems for computer systems.

Also, approaches for monitoring a rate of flow of a fluid through one or more conduits might be desirable in some applications. For example, a rate of heat transfer through a liquid-to-liquid or an air-to-liquid (or a liquid-to-air) heat exchanger can correspond to a rate of flow of a heat transfer medium (e.g., a liquid coolant) through the heat exchanger. As but one other example, a substantial excursion of fluid flow rate through a conduit can indirectly indicate a leak upstream of the conduit, or a change in heat-transfer performance.

However, many commercially available flow-rate sensors are generally considered to be incompatible with existing liquid-cooling systems suitable for computer systems. For example, some known flow-rate sensors are typically too large, too expensive, or both, to be incorporated into liquid-cooling systems suitable for widespread commercialization in connection with cooling systems for computer systems, or other systems.

Commercially available, liquid-based heat-transfer systems, particularly but not exclusively liquid- or two-phase-cooling systems for electronics, have not provided controllable, reconfigurable, or customizable arrangements of fluid flow paths once a given heat-transfer system has been installed. Nonetheless, controllable, reconfigurable, or customizable fluid-flow paths can be desirable in some instances, as when a leak is detected and/or a detected flow rate through a particular conduit, channel, or other fluid passage exceeds or falls below a selected threshold. For example, automatically isolating a branch of fluid circuit responsive to a detected leak could be desirable in an attempt to avoid damage to, for example, nearby electronic components.

Accordingly, there remains a need for sensors configured to detect a leak from a liquid cooling system. There also remains a need for a monitoring system configured to initiate an alert responsive to a leak detected by the leak detector. A need also remains for a leak detector configured to be compatible with a control system for a computer system or other computing environment. And, there remains a need for flow-rate sensors configured to detect or sense a rate of flow of a working fluid through a conduit, for example, a portion of a flow path through a portion of a liquid-cooling system. There remains a further need for flow sensors to emit a signal responsive to a detected or a sensed flow rate of the working fluid. There also remains a need for such sensors to be compatible with existing communications busses, e.g., by using existing communication protocols or by multiplexing over existing communication busses (e.g., an IPMI bus). As well, a need remains for apparatus and methods for controlling, reconfiguring, and/or customizing a flow path through a given heat-transfer system. In addition, a need remains for apparatus and methods for isolating one or more branches of a fluid circuit.

SUMMARY

Innovations and related subject matter disclosed herein overcome many problems in the prior art and address one or more of the aforementioned, or other, needs. This disclosure pertains generally to control systems, for example, detectors configured to issue an alert or a command to a controller in response to a detected change in state of a given system, electro-mechanically actuated flow-path controllers, with automatically decoupleable couplers and electro-mechanically actuated valves being but two specific examples of disclosed flow-path controllers, and combinations thereof.

By way of example, a disclosed control system has a sensor circuit configured to emit a simulated signal corresponding to a selected physical parameter as a proxy for an observed operational parameter different from the selected physical parameter. A controller is configured to receive the simulated signal and to infer from the simulated signal a state of the observed operational parameter. An electro-mechanical actuator is selectively activatable based at least in part on the inferred state of the observed operational parameter.

The controller can be configured to emit a command signal responsive to the state of the observed operational parameter and the electro-mechanical actuator can be selectively activatable responsively to the command signal. The simulated signal can be a simulated fan-tachometer signal, and the selected physical parameter can be a fan speed. In some examples, the sensor is a leak detector, and the observed operational parameter is a detected presence or a detected absence of a leak by the leak detector. The simulated signal can be, for example, a simulated reproduction of a waveform emitted by a properly or an improperly operating, or a failed, fan.

The selected physical parameter can be a rotational fan speed and the observed operational parameter can consist of one or more of an indicia of fluid level, an indicia of pressure, an indicia of electrical current, and an indicia of a presence or absence of moisture.

The observed operational parameter can be an indicia of a presence or absence of a working fluid externally of a liquid-based heat-transfer system. The sensor can include an electrical circuit configured to emit the simulated signal responsive to the indicia of a presence of the working fluid externally of the liquid-based heat transfer system, and the electro-mechanical actuator can be configured to decouple matingly engaged couplers or to close a valve to isolate a branch of a fluid circuit.

In other examples, methods of isolating a branch of a fluid circuit from a liquid-based heat-transfer system are disclosed. A presence or an absence of a working fluid can be sensed externally of a liquid-based heat-transfer system. An electro-mechanical actuator can be activated to close a valve and/or to decouple matingly engaged members of a fluid coupler.

For example, a signal can be emitted responsive to the sensed presence or absence of the working fluid. The emitted signal in the sensed absence of the working fluid can be, for example, a simulated tachometer signal of the type emitted by an operable fan.

Rack-mountable server systems are disclosed. In such a system, a branch of a fluid circuit can be configured to convey a liquid from an inlet to the branch to an outlet from the branch. The inlet and the outlet can be fluidly coupled with a liquid supply and a liquid collector, respectively. A sensor can be configured to detect a presence of the working fluid externally of the branch, and an electro-mechanical actuator can be configured to fluidly isolate the branch from the fluid circuit responsive to a detected presence of the working fluid externally of the branch.

Some disclosed rack-mountable server systems also include an electrical circuit operatively coupled to the sensor and being configured to emit a signal responsive to a detected presence of the liquid externally of the conduit. The electro-mechanical actuator can be actuatable responsive to the signal. The electro-mechanical actuator can be configured to close one or more valves and/or to decouple matingly engaged members of a fluid coupling. For example, a linkage can couple the electromechanical actuator to one or more of the valves and/or to a movable portion of the matingly engaged members.

Some rack-mountable server systems also include a server rack and a plurality of independently operable servers received in the rack. The liquid supply can be a distribution manifold and the liquid collector can be a collection manifold. The branch of the fluid circuit can be a branch of a heat-transfer system corresponding to a first server and the electro-mechanical actuator can be a first electro-mechanical actuator corresponding to the first server. Each other server can have a corresponding branch of the heat-transfer system with an inlet fluidly coupled to the distribution manifold and an outlet fluidly coupled to the collection manifold. A plurality of electro-mechanical actuators can each correspond to one of the other servers and each be configured to fluidly isolate each respective branch from the heat-transfer system.

The inlet to each branch of the heat-transfer system can have a first member of a decoupleable fluid coupling and the distribution manifold can have a second member of the decoupleable fluid coupling corresponding to each branch. Each respective first member and corresponding second member can be so correspondingly configured as to be matingly engageable with each other. As well, each respective electro-mechanical actuator can be configured to decouple the respective matingly engaged first member and second member from each other.

Some disclosed rack-mountable server systems have a plurality of valves. Each valve can be positioned adjacent a corresponding one of the branch inlets. Each valve can be selectively activatable by the corresponding electro-mechanical actuator. Each branch can also have one or more check valves. For example, a check valve can be positioned adjacent a corresponding one of the branch outlets and be configured to prevent a backflow of a working fluid from the collection manifold into the respective branch of the heat-transfer system.

A rack-mountable server system can have a printed circuit board, and the sensor can be a sensitive region operatively coupled to the printed circuit board at a position adjacent a component susceptible to wetting by the liquid if a leak of the liquid from the branch occurs Some disclosed detectors are configured to emit a simulated signal (e.g., an electrical signal) as a proxy for a state observed by a sensor, with a simulated fan-tachometer signal being but one example of a proxy signal.

Some disclosed detectors are configured to detect a leak of a working fluid from a heat-transfer system. Some disclosed leak detectors are configured to issue an alert or a command to a controller in response to a detected leak of a working fluid from a liquid-based heat transfer system.

Some disclosed detectors are configured to assess one or more aspects of a flow field, e.g., to assess a flow rate. Some disclosed detectors are configured to detect a flow rate of a working fluid through a portion of a heat-transfer system. Some disclosed flow-rate sensors are configured to emit a signal, or to issue an alert or a command to a controller in response to an observed or a detected change in state of a given system.

For example, some disclosed flow-rate sensors are configured to emit a signal, or to issue an alert or a command to a controller in response to an observed or a detected rate of flow (or an indicia of a rate of flow) of a working fluid through a liquid-based heat transfer system, as when an observed, detected, or indicated rate of flow exceeds a selected upper threshold flow rate or falls below a selected lower threshold flow rate. Some flow-rate sensors are configured to emit an output signal corresponding to an observed rate of flow (or an observed indicia thereof).

By way of example and not limitation, a flow-rate sensor can be configured to emit a simulated fan-tachometer signal (or other proxy signal) proportional to (or, more broadly, corresponding to) an indicia of flow rate observed by the sensor. A controller configured to receive such a simulated fan-tachometer signal can interpret the simulated fan-tachometer signal as corresponding to a predetermined measure of the indicia of flow rate (or measure of the flow rate). In response, the controller can issue a system command in correspondence to the indicia (or flow rate). As but one example, the system command can be a command to transmit an alert to a system administrator and/or a command to increase pump speed, as when the indicated flow rate might not suffice to cool an observed or an anticipated heat load, or to decrease pump speed, as when the indicated flow rate might provide more cooling than necessary based on an observed or an anticipated heat load and continued operation of the pump at a relatively higher speed emits more acoustic noise or consumes more energy than desired.

In some embodiments, an emitted signal, or an alert or command, includes a simulated fan-tachometer signal corresponding to a selected fan-rotational-speed as a proxy for an observed state different than a fan-rotational-speed (e.g., a flow rate or a detected leak). For example, an observed operational state can include an operational state of one or more system devices (e.g., a pump in a liquid-cooling system, a heat exchanger in a liquid cooling system, a frequency of an optical signal emitted by an optical emitter, an observed flow rate through one or more portions of a cooling system (e.g., through a segment of a conduit carrying a working fluid), etc.).

As but one possible and non-limiting example, a sensor can emit, in response to a detected one of a plurality of observable conditions, a simulated fan-tachometer signal corresponding to a respective fan-rotational speed as a proxy corresponding to the detected condition. For example, a leak detector can emit, in response to a detected leak, a simulated fan-tachometer signal corresponding to a fan-rotational-speed of 500 RPM (revolutions per minute). In turn, the fan rotational speed of 500 RPM can be interpreted by a controller as indicating, for example, that a leak has occurred (or at least has been detected) at a given system location.

As another example, a flow-rate sensor can emit, in response to a first observed flow rate (or an observed indicia of such a flow rate), a simulated fan-tachometer signal corresponding to a first fan-rotational-speed and a second fan rotational speed in response to an observed other flow rate (or indicia thereof). For example, the flow-rate sensor can emit a simulated fan-tachometer signal indicative of a selected fan speed proportional to the observed flow rate (or indicia thereof). A controller that receives such a proxy signal can, at least partially responsively to the proxy signal, issue a selected command (e.g., a system command to alter or to maintain a system operational state, a system shutdown command, an administrator alert command) responsive to a given interpretation of the proxy signal.

Some controllers are embodied in a computing environment.

As used herein, "working fluid" means a fluid used for or capable of absorbing heat from a region having a relatively higher temperature, carrying the absorbed heat (as by advection) from the region having a relatively higher temperature to a region having a relatively lower temperature, and rejecting at least a portion of the absorbed heat to the region having a relatively lower temperature. Although many formulations of working fluids are possible, common formulations include distilled water, ethylene glycol, propylene glycol, and mixtures thereof.

Some disclosed leak detectors include a sensor operatively coupled to a leak detector circuit. A leak detector circuit can be configured to deliver a signal having a selected waveform to a monitor circuit during normal operation of the cooling system and to terminate or otherwise interrupt the signal (as by modifying the waveform, for example) when a leak of liquid is detected, as by the sensor. Some disclosed leak detectors are configured to deliver a simulated tachometer signal to a monitor circuit or computing environment. The simulated tachometer signal can be similar to a tachometer signal emitted by a fan during normal operation of the fan until a leak is detected. Upon receiving a signal or other indication of a leak, the leak detector circuit can emit a different signal (or no signal) after a leak is detected. The different signal can be emitted continuously or only while a leak (or moisture or other proxy for a leak) is detected by the sensor.

For example, some disclosed leak detector circuits are configured to emit a simulated tachometer signal, e.g., a square wave having a duty cycle of about 50% (e.g., a duty cycle ranging from about 45% to about 55%), during normal operation, and to terminate or otherwise interrupt the simulated tachometer signal in response to a detected leak (or moisture or other proxy for a leak, such as a low operating pressure or a low-fluid level internal to the heat-transfer system). Such a leak detector circuit can be compatible with commercially available monitor circuits, firmware and/or software, particularly but not exclusively, monitor circuits, firmware and/or software configured to monitor a rotational speed of a fan using a tachometer signal emitted by the fan. Some monitors (e.g., circuits and/or computing environments) can be based on, by way of example, the Intelligent Platform Management Initiative (IPMI) specification, ver. 1.5/2.0 (described more fully below).

In some embodiments, a plurality of sensors or detectors can be operatively coupled to a given communication circuit, and a controller can configured to monitor the given communication circuit. Each respective sensor or detector in the plurality of sensors or detectors can be configured to emit any of a plurality of discrete, simulated signals as respective proxies for a plurality of selected, detectable operational states. For example, the sensors or detectors can emit discrete, simulated fan-tachometer signals corresponding to respective system operational states. Such multiplexing can allow existing communication channels to carry information regarding observed system operational states that differ substantially from the information historically carried by the existing communication channels.

By way of example and not limitation, a leak detector can be configured not to emit a simulated fan-tachometer signal in the absence of an observed leak, and to emit (e.g., over a selected communication circuit), responsively to a detected leak, a selected simulated fan-tachometer signal (e.g., a simulated fan-tachometer signal corresponding to a fan-rotational speed of 200 RPM). A controller configured to receive such a simulated fan-tachometer signal can interpret the simulated fan-tachometer signal as corresponding to a predetermined operational state. In response, the controller can issue a system command in correspondence with the operational state. As but one example, the system command can be a command to transmit an alert to a system administrator or a command to shut the system down.

As another example, a sensor can be configured to observe an operational state of a centrifugal pump. The sensor can be configured to emit a simulated fan-tachometer signal corresponding to a different fan-rotational speed (e.g., 400 RPM) in response to an observed pump failure (e.g., a pump rotational speed below a selected threshold rotational speed). A controller configured to receive the simulated fan-tachometer signal can issue a system command in response to and corresponding to the indication of a pump failure. The system command can include one or more of a command to transmit an alert to a system administrator, a command to increase a rotational speed of one or more other selected pumps, and a command to shut the system down.

Other particular but non-exclusive examples of multiplexed sensors include sensors configured to observe one or more of a rotational speed of the pump, a static pressure in a fluid within the pump, a temperature of a liquid in the pump, a temperature of a pump component, a flow rate through a conduit, and a number of hours during which a given pump has operated. Each sensor can be configured to emit a selected proxy signal corresponding to an observed operational state of the system.

Other innovative aspects of this disclosure will become readily apparent to those having ordinary skill in the art from a careful review of the following detailed description (and accompanying drawings), wherein various embodiments of disclosed innovations are shown and described by way of illustration. As will be realized, other and different embodiments of leak detectors and systems incorporating one or more of the disclosed innovations are possible and several disclosed details are capable of being modified in various respects, each without departing from the spirit and scope of the principles disclosed herein. For example, the detailed description set forth below in connection with the appended drawings is intended to describe various embodiments of the disclosed innovations and is not intended to represent the only contemplated embodiments of the innovations disclosed herein. Instead, the detailed description includes specific details for the purpose of providing a comprehensive understanding of the principles disclosed herein. Accordingly the drawings and detailed description are to be regarded as illustrative in nature and not as restrictive.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of systems incorporating aspects of the presently disclosed principles are illustrated by way of example, and not by way of limitation, wherein:

FIG. 3 shows a representative pin-out for a fan header operatively coupled to a pump;

FIG. 7 shows a pinout of a fan header operatively coupled to an embodiment of a leak detector disclosed herein;

FIG. 11 shows a schematic illustration of an optical flow-rate sensor;

FIG. 12 shows a schematic illustration of a retainer suitable for the optical flow-rate sensor shown in FIG. 11:

FIGS. 16A and 16B show respective schematic illustrations of a rotational member of the type shown in FIG. 13; in FIG. 16A, a reflector is shown; in FIG. 16B, the rotational member has rotated to a position obscuring the reflector shown in FIG. 16A from view;

FIG. 21 shows a branch of fluid circuit of a heat transfer system.

DETAILED DESCRIPTION

Figure 1:
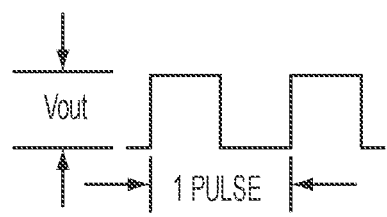
FIG. 1 shows a representative pulse of a square wave emitted by a Hall cell in response to a rotating fan rotor.

The following describes various innovative principles related to control systems by way of reference to specific examples of sensors, actuators, and couplers included in such systems. More particularly, but not exclusively, such innovative principles are described in relation to examples of leak detectors configured to detect a leak of a working fluid from a liquid-based heat transfer system (e.g., a liquid-based cooling system for cooling one or more electronic components that dissipate heat during operation), examples of flow-rate sensors configured to observe a flow rate through a liquid-based heat-transfer system, examples of decoupleable couplers, examples of actuators configured to actuate a decoupleable coupler, and related systems. Nonetheless, one or more of the disclosed principles can be incorporated in various other control system embodiments to achieve any of a variety of desired control system characteristics. Systems described in relation to particular configurations, applications, or uses, are merely examples of systems incorporating one or more of the innovative principles disclosed herein and are used to illustrate one or more innovative aspects of the disclosed principles.

Thus, control systems, sensors, leak detectors, flow-rate sensors, decoupleable couplers, actuators, and associated circuits, computing environments, firmware and/or software having attributes that are different from those specific examples discussed herein can embody one or more of the innovative principles, and can be used in applications not described herein in detail, for example, to detect a leak of a fluid (e.g., a liquid, a gas, or a saturated mixture thereof) from, or to observe a local speed of a flow of such a fluid through, a heat-transfer system having any of a variety of flow configurations, such as a contained flow within a fluid conduit or a free-stream flow (e.g., a region of a fluid flow sufficiently spaced from a fluid boundary as not to be influenced by the boundary). Such systems can be configured to transfer heat to or from laser components, light-emitting diodes, chemical reactants undergoing a chemical reaction, photovoltaic cells, solar collectors, power electronic components, electronic components other than microprocessors, photonic integrated circuits, and other electronic modules, as well as a variety of other industrial, military and consumer systems now known or hereafter developed. Accordingly, embodiments of detectors and related control systems not described herein in detail also fall within the scope of this disclosure, as will be appreciated by those of ordinary skill in the art following a review of this disclosure.

Overview

A wide variety of control systems have been proposed and used. In a general sense, control systems estimate or observe an attribute of a given system under control of the control system. In response to the estimated or observed attribute, a control system can provide an output corresponding to the estimated or observed attribute in order to achieve a desired system response. Controls systems (or portions thereof) disclosed herein can be implemented in a computing environment. As indicated above and explained more fully below, some disclosed systems are configured to detect a leak of a working fluid from, for example, a liquid-based heat-transfer system. Some disclosed systems are configured to transmit an alert or other command in response to a detected leak.

Some disclosed sensors are configured to be backward compatible with existing control systems. For example, some existing control systems configured to monitor an operational status of a cooling fan for a computer system are configured to emit a signal corresponding to observed fan speeds, or to issue an alert or other command, when an observed fan speed drops below a selected threshold.

Taking advantage of an installed base of such existing control systems, some disclosed sensors have a circuit configured to emit a first simulated tachometer signal corresponding to a first observed condition (e.g., similar to a tachometer signal emitted by a normally operating fan) and to emit a different simulated tachometer signal corresponding to a second observed condition. In some instances, the different signal emitted in response to the second observed condition can be similar to a tachometer signal emitted by a failed or failing fan (e.g., a fan operating at an unacceptably low fan speed, or a fan having a locked rotor).

Another example of an operational status includes a flow rate through a conduit. Some disclosed sensors emit a simulated fan tachometer signal in correspondence with an observed volumetric (or mass) flow rate (or indicia thereof, such as, for example, a rotational speed of a rotational member within the flow of fluid).

An operational status can reflect a presence or absence of a detected leak. Some disclosed leak detectors have a circuit configured to emit a simulated tachometer signal similar to a tachometer signal emitted by a normally operating fan when no leak is detected and to emit a different signal (or no signal) in response to a detected leak. The different signal emitted in response to a detected leak can be similar to a tachometer signal emitted by a failed or failing fan (e.g., a fan operating at an unacceptably low fan speed, or a fan having a locked rotor).

Some disclosed systems incorporate a sensor configured to detect or observe an indicia of a change in state of a heat-transfer system. Some indicia pertain to a rate of flow of a working fluid, for example, through a portion of a liquid-based heat-transfer system. Other indicia pertain to a leak of such a working fluid. Some disclosed systems are configured to transmit an alert or other command in response to a threshold condition observed or detected by such a sensor.

As but one example, some disclosed flow-rate sensors are configured to observe (or to detect) a frequency at which a rotational member rotates about a selected axis of rotation in response to a passing flow of a working fluid. As will be described more fully below, such a rotational frequency can correspond to a speed (and thus a rate of flow) at which a flow of a selected fluid passes by or over the rotational member.

Control Systems

By way of introduction, computer systems commonly include one or more axial fans for cooling an electronic component. A rate of heat transfer from an electronic component or from a liquid-to-air heat exchanger (e.g., a radiator) to a stream of air passing over the component or the heat exchanger generally corresponds, in part, to a speed of the air stream. A speed of such an air stream generally corresponds to a rotational speed of the fan.

Taking advantage of such a correspondence between a fan's rotational speed (sometimes expressed in units of "revolutions per minute" or "RPM", and sometimes referred to as a "fan speed") and a rate of cooling afforded to an electronic component or a heat exchanger, some computer systems include a control system configured to adjust a fan speed in response to an observed temperature (e.g., a temperature of an electronic component). As an example, some control systems are configured to modulate a duty cycle of, for example, a square wave, and some fans, in turn, are configured to adjust their fan speed in correspondence with the modulated duty cycle.

In addition (or alternatively), some computer systems include a control system configured to observe an output signal from a fan. Such an output signal can correspond to a rotational speed of the fan. For example, a fan can include a Hall cell configured to emit a square wave having a frequency corresponding to a rotational speed of a rotating magnetic field generated by a rotating fan rotor. Such an emitted square wave can have a duty cycle of about 50% when the rotor rotates at an approximately constant speed.

Figure 2:
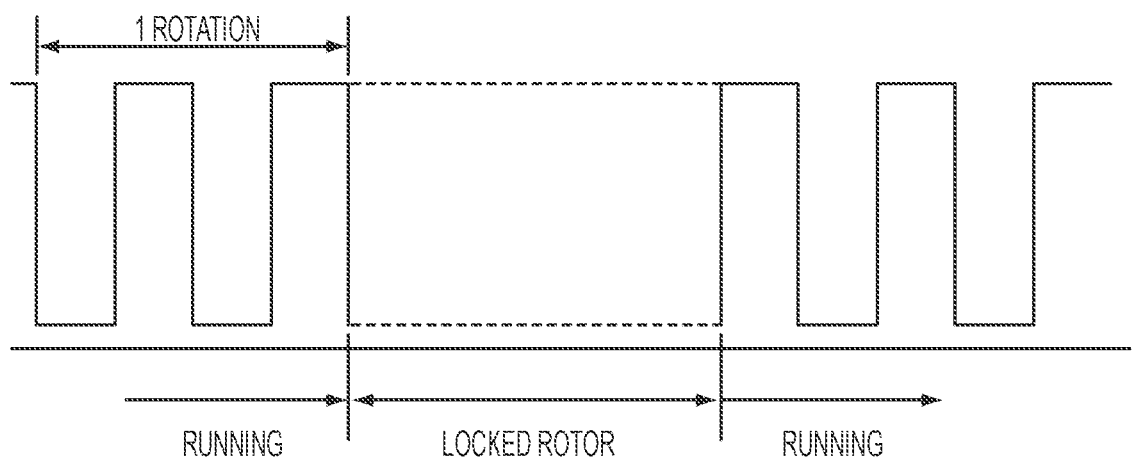
FIG. 2 shows a representative signal emitted by a fan in a running state, a locked rotor state, and another running state.

Since the frequency of the square wave can correspond to the rotational speed of the fan, such a square wave is sometimes referred to as a "tachometer signal." FIG. 1 illustrates one pulse from a typical tachometer output having a square wave waveform. As another example, FIG. 2 shows a representative waveform of a tachometer output for a fan that changes from an operating state ("Running") having a 50% duty cycle, to a "Locked rotor" state in which no tachometer signal (or a steady-state signal) is emitted because the fan rotor does not rotate, and back to an operating state ("Running") having a 50% duty cycle.

In general, a control system can be configured to transmit an alert or other command in response to an observed signal exceeding a selected upper threshold or falling below a selected lower threshold. Some control systems are configured to resume monitoring the observed signal after transmitting the alert or other command. Other control systems (sometimes referred to in the art as a "latching system") are configured to continuously transmit an alert or other command.

Some existing control systems are configured to observe a tachometer signal emitted by a rotating fan and to emit a signal or otherwise initiate a system command (e.g., send an "alert", or initiate a system shut-down) in response to a selected change in state of a tachometer signal. A selected change of state of a tachometer signal can include a drop in frequency below a selected threshold (e.g., corresponding to an unacceptably low fan speed), a cessation of a tachometer signal or an emission of steady-state tachometer signal, as when a fan rotor stops rotating. In relation to FIG. 2, such a control system can be configured to emit a signal or otherwise initiate a system command if an observed signal indicates that a fan is in a "locked rotor" state.

Some suitable control systems configured to monitor fan speed are based on the Intelligent Platform Management Initiative (IPMI) specification, ver. 1.5/2.0. Generally, IPMI is a message-based, hardware-level interface specification. An IPMI subsystem can operate independently of an operating system of a computer incorporating the IPMI subsystem, allowing a system administrator to manage the computer independently of the operating system (e.g., before the operating system boots, or when the computer is powered down). A Baseboard Management Controller (BMC) can include a specialized microcontroller configured to manage an interface between the system management software and computer system hardware.

Among many features, an IPMI subsystem can monitor a status of various operating parameters, including, for example, system temperatures, fan speeds, chassis intrusion, etc. In some instances, an IPMI subsystem can be configured to monitor a tachometer signal emitted by one or more fans and, when the tachometer signal indicates a fan speed below a selected threshold, the subsystem can emit an alert or other command.

Computer systems incorporating such control systems for fans commonly include a plurality of electrical connectors, with each being configured to operatively couple a fan to a corresponding plurality of circuits configured, respectively, to power, control and monitor the fan. For example, such an electrical connector can have four electrical couplers corresponding respectively to (A) a power supply circuit configured to convey an electrical current for powering the fan motor; (B) an electrical ground; (C) a pulse-width modulation circuit configured to convey a pulse-width modulation signal (sometimes referred to as a "PWM signal") for controlling the fan; and (D) a sense circuit configured to convey a tachometer signal corresponding to a fan speed (sometimes referred to in the art more generally as a frequency generator signal, or an "FG" signal). Such an electrical connector is sometimes referred to in the art as a "header" or a "fan header". FIG. 3 shows a typical pinout for a header with annotations reflecting use of the header in conjunction with a pump.

Leak Detectors

A leak detector circuit can be configured to respond to a leak (e.g., moisture or another selected proxy for a leak) of a working fluid detected by a sensor. For example, an innovative leak detector circuit can be configured to emit a first waveform in the absence of a detected leak and to emit a second waveform responsive to a detected leak. Any suitable sensor configured to detect a leak (or other proxy for a leak, e.g., moisture, presence of a working fluid at a position external to a heat-transfer system, a low pressure in the heat-transfer system, a low fluid level in the heat-transfer system) can be used in connection with such an electrical circuit.

Figure 4:
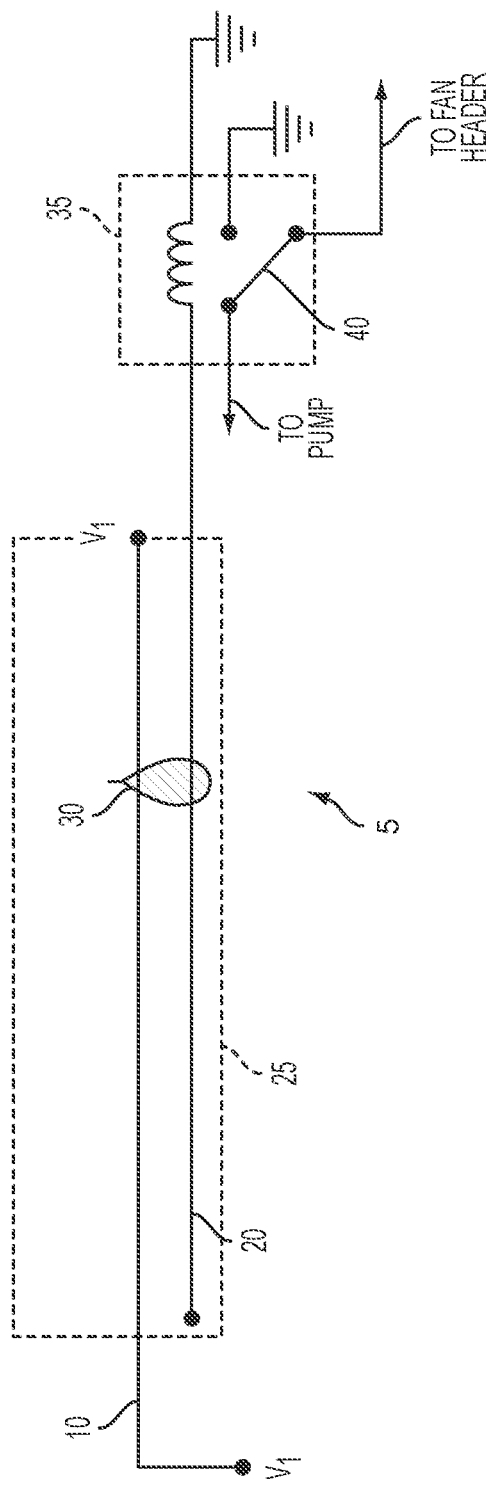
FIG. 4 shows a portion of but one of many leak detector embodiments disclosed herein.

As but one of many possible examples of leak-detection sensors, a leak-detection sensor 5 can have a first leak-detection wire 10 and a second leak-detection wire 20, as shown in FIG. 4. The first and the second leak-detection wires 10, 20 can comprise respective exposed traces on a printed circuit board. As shown in FIG. 4, the first leak-detection wire 10 can extend from a power plane, $V_1$. The second leak-detection wire 20 can extend generally parallel to and spaced apart from the first leak-detection wire 10. A region in which the first and the second wires 10, 20 are coextensive can define a leak-sensitive region 25 of the sensor.

A leak can be detected when an open circuit between the first and the second leak-detection wires 10, 20 is closed. For example, a drop 30 of a leaked liquid can span a gap between the first and the second leak-detection wires 10, 20 within the leak-sensitive region 25 of the sensor 5, electrically coupling the first and the second leak-detection wires to each other.

When the circuit between such first and second leak-detection wires 10, 20 is closed, the circuit of the leak detector 5 can emit a corresponding signal indicative of a detected leak. For example, when the first and the second leak-detection wires 10, 20 shown in FIG. 4 are electrically coupled to each other, the second leak-detection wire 20 can be pulled high (e.g., can have a voltage potential corresponding to the voltage of the power plane, $V_1$), and can activate a relay 35. When the illustrated relay 35 is activated, the latch 40 electrically coupling the pump and the fan header to each other can be switched to open (e.g., disconnect) the coupling between the pump and the fan header. Such a disconnection of at least one coupling between the pump and the header can serve as a signal to a monitoring system that a leak has been detected. The monitoring system can in response initiate an alert or a system command. In other instances, such a relay can close a circuit to activate an electro-mechanical actuator of the type described herein, e.g., to physically disconnect or to otherwise isolate a branch of a fluid circuit of a heat-transfer system.

Figure 5:
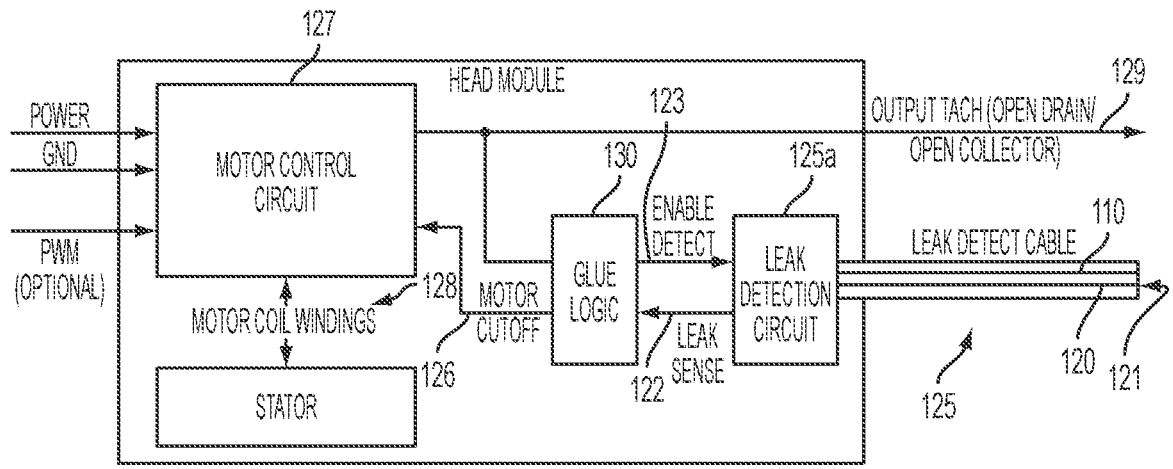
FIG. 5 shows a block diagram of a leak detector and a portion of an associated control system in relation to a fluid heat exchange system.

In FIG. 5, a leak detection sensor is schematically illustrated as extending from an integrated pump and heat exchanger assembly (sometimes referred to in the art as a "Head Module"). U.S. patent application Ser. No. 12/189, 476 and related priority patent applications, each of which is incorporated herein in full, for all purposes, describe examples of such Head Modules. The leak detection sensor 125, 125a shown in FIG. 5 has first and second leak-detection wires 110, 120 (referred to in FIG. 6 as "Cable Conductor 1" and "Cable Conductor 2", respectively) spaced apart from each other to form a gap 121. Such a leak detection sensor is sometimes referred to in the art as a "Leak Detect Cable." One or both of the leak-detection wires 110, 120 can be partially or fully embedded (or otherwise surrounded by) a semi-conducting carrier. The first and/or the second leak-detection wires 110, 120 can be formed from an alloy of copper.

Figure 6:
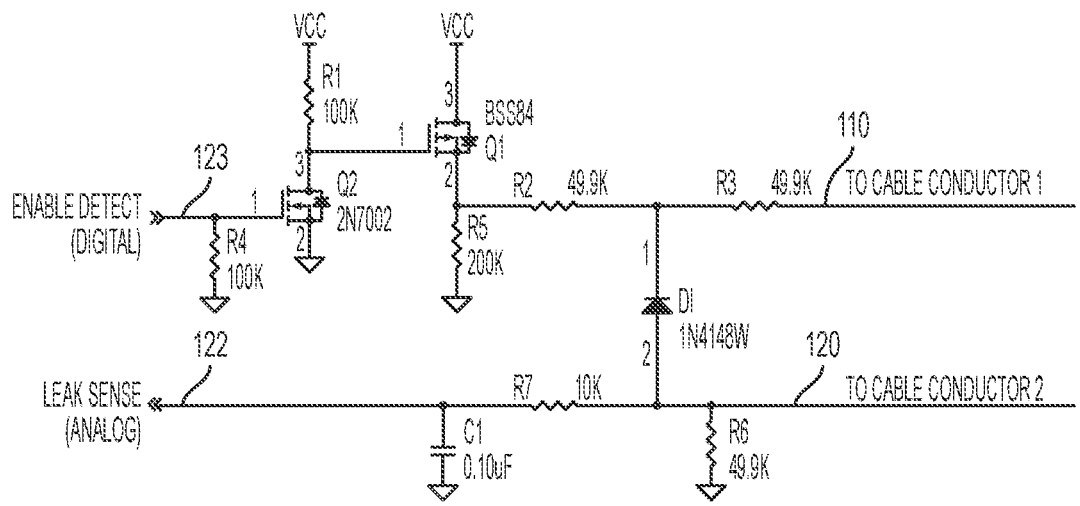
FIG. 6 shows a schematic illustration of an embodiment of a circuit configured according to the block diagram shown in FIG. 5.

A conductive fluid spanning the gap between the first and second leak-detection wires 110, 120 can provide a "non-trivial" resistance between the first and the second leak-detection wires. As used herein, a "non-trivial resistance" means a finite resistance sufficient to electrically couple the first and the second leak-detection wires to each other. With a circuit configured as shown in FIG. 6, a non-trivial resistance between the first and the second leak-detection wires can supply the analog Leak Sense line 122 with a non-zero voltage.

As indicated in FIG. 5, some leak detectors have a functional module 130 (sometimes referred to in the art as a "Glue Module") configured to respond to a leak detected by a leak detection sensor 125. The Glue Module shown in FIG. 5 can be configured to deliver a logic high signal to the FG line (labeled as "Output Tach" in FIG. 5) responsive to a signal indicative of a leak received over the Leak Sense line 122.

In some embodiments, the Glue Logic module is configured to monitor the Leak Sense line 122 continuously. In other embodiments, the Glue Logic module is configured to sample the Leak Sense line 122 at defined times (e.g., at selected intervals, or at selected intermittent times). The Glue Logic can also be configured to transmit a signal over an Enable Detect line 123, and, as shown by way of example in FIG. 6, the Leak Detection Circuit 125a can be configured to become operative in response to a signal received over the Enable Detect line 123.

A Glue Logic module can be configured to interrupt operation of a pump motor responsive to a signal received over the Leak Sense line 122 indicative of the existence of a leak (e.g., an electrical coupling between the first and the second leak-detection wires). For example, a Motor Cutoff line 126 can carry a signal emitted by the Glue Logic, and a Motor Control Circuit 127 can respond to a signal received over the Motor Cutoff line 126 by interrupting power to the motor 128. Alternatively (or additionally), the Glue Logic can force an output tachometer signal 129 (e.g., an FG signal) from the Head Module to a logic 0 (e.g., low logic) to signify to a monitoring system that there has been a failure associated with the Head Module.

Many other leak-detection sensor and leak detector circuit configurations are possible. As but several examples, such sensors can include a capacitive moisture sensor, an optical sensor, an infrared sensor, a pressure sensor configured to observe a pressure within the heat-transfer system, a sensor configured to detect a low fluid level in the heat-transfer system, and other sensors now known and hereafter developed.

Some leak detectors can have an electrical circuit operatively coupled to an FG signal pin of a header and be configured, in the absence of a detected leak, to emit a simulated tachometer signal 129 having a waveform similar to a waveform emitted by a properly operating fan. FIG. 7 shows a header operatively coupled to such an electrical circuit. The electrical circuit (not shown) can be further configured to emit a simulated tachometer signal 129 having a waveform similar to a failed or failing fan in response to a detected leak of a liquid from a liquid-base heat-transfer system (e.g., when a circuit between first and second leak-detection wires is closed). Alternatively, the electrical circuit can be configured to emit no tachometer signal, similar to a fan having a locked rotor (see FIG. 2) in response to a detected leak of a liquid from a liquid-based heat-transfer system.

As an example, a leak detector circuit 225 can be operatively coupled to an available fan header. In response to a detected leak, the simulated signal can be interpreted as by switching a relay as described above in relation to FIG. 4.

Alternatively, a leak-detection sensor 225 can be operatively coupled to an electrical circuit associated with one or more pumps 210 of a liquid-based heat-transfer system. For example, such a pump 210 can be electrically coupled to a header 231 having a power pin, a ground pin, a PWM pin and an FG pin. The power pin can be operatively coupled to the pump motor to convey an electrical current to the pump to operate the pump. The PWM pin be operatively coupled to a pump controller and convey a pump-control signal to the pump controller, e.g., to control a speed of the pump. The FG pin can convey monitor a tachometer signal emitted by the pump to a sensing circuit configured to monitor the pump (or fan) speed.

In one example (e.g., shown in FIG. 8), a leak detector circuit 225 can be operatively coupled between the power pin of the header 231 and the pump motor 210. In such an embodiment, the leak detector circuit 225 can interrupt a supply of electrical current to the pump (or increase a supply of electrical current to the pump) in response to a detected leak, causing a corresponding reduction (or increase) in pump speed. A corresponding FG signal emitted by the pump can reflect the diminished (or increased) pump speed. A system configured to monitor the FG signal emitted by the pump can, in response to a reflected change in pump speed, transmit an alert signal (e.g., to a system administrator), a system command (e.g., a command to increase a pump speed of another pump in an attempt to compensate for a diminished performance of a stalled pump, a system-shut-down command, etc.), or both. Some implementers might elect not to interrupt power to a pump if stopping a pump might be considered a catastrophic failure.

In an alternative embodiment, a leak detector circuit 225 can be operatively coupled between the PWM pin of the fan header 231 and the pump 210. In such an embodiment, the leak detector circuit 225 can interrupt a PWM signal conveyed to the pump 210 by the PWM pin of the fan header and convey an alternative PWM signal (or no PWM signal) to the pump in response to a detected leak. The alternative PWM signal can cause the pump to speed up, to slow down, or to stop. An FG signal emitted by the pump can reflect the change in pump speed. A system configured to monitor the FG signal emitted by the pump can, in response to a reflected change in pump speed, transmit an alert signal (e.g., to a system administrator), a system command (e.g., a command to increase a pump speed of another pump in an attempt to compensate for a diminished performance of a stalled pump, a system-shut-down command, etc.), or both.

In still another alternative embodiment, a leak detector circuit 225 can be operatively coupled between the FG pin of the fan header 231 and the pump 210. In such an embodiment, the leak detector circuit 225 can interrupt an FG signal emitted by the pump and convey an alternative FG signal (or no FG signal) to the FG signal pin in response to a detected leak. The alternative FG signal can simulate a diminished pump speed, a selected increased pump speed, or no pump speed. A system configured to monitor the simulated FG signal can, in response to a selected change in the simulated FG signal corresponding to a change in pump speed, transmit an alert signal (e.g., to a system administrator), a system command (e.g., a command to increase a pump speed of another pump in an attempt to compensate for a diminished performance of a stalled pump, a system-shut-down command, etc.), or both.

Figure 8:
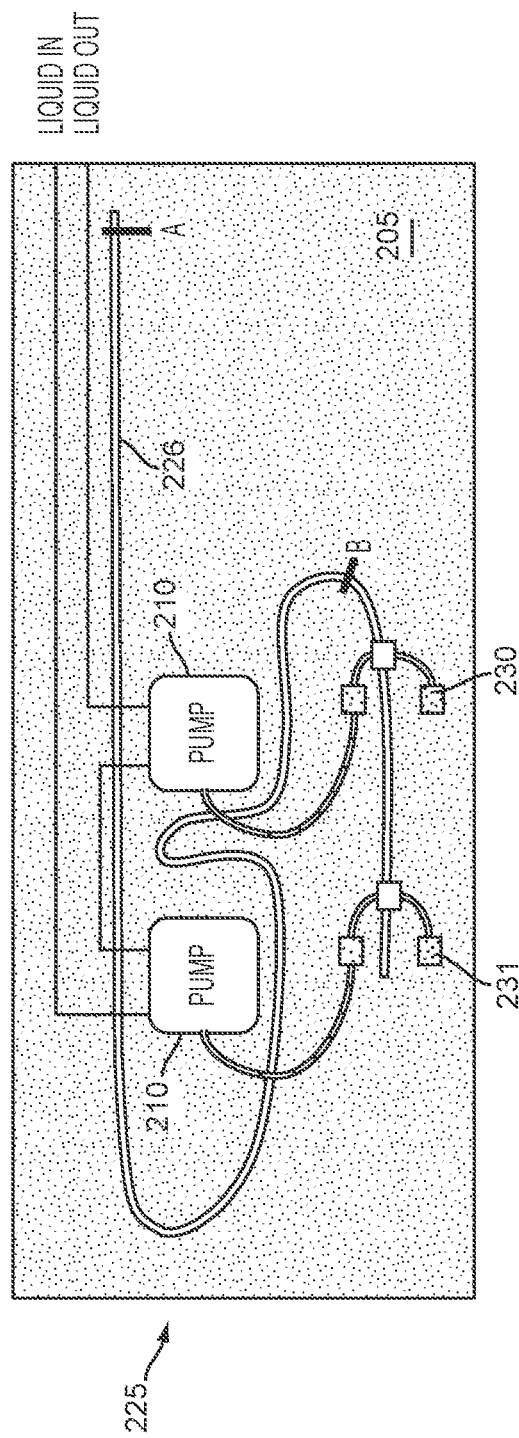
FIG. 8 shows a schematic illustration of a system including a leak detector disclosed herein.
Figure 9:
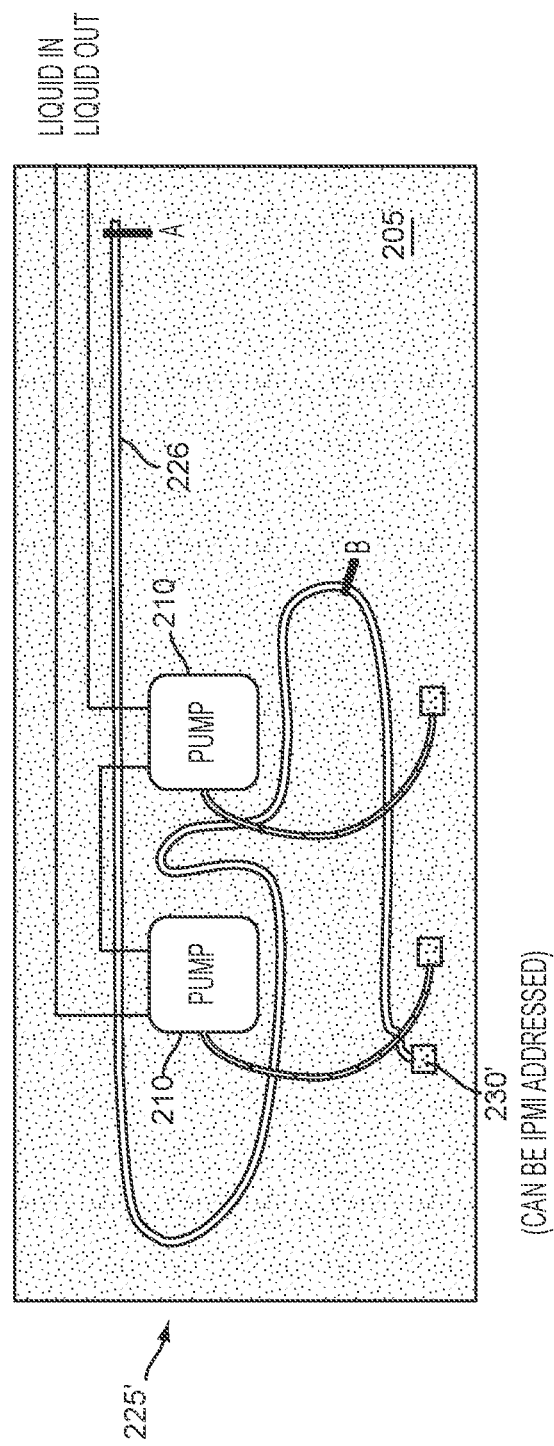
FIG. 9 shows a schematic illustration of an alternative system including a leak detector disclosed herein.

A leak sensor 225 can be positioned adjacent to (e.g., routed around) a pump 210 or other component of a liquid-based heat-transfer system, as indicated by way of example in FIGS. 8 and 9. For example, a sensor 225 can be positioned on, embedded in, affixed to, positioned adjacent to, or otherwise operatively coupled to a printed circuit board 205 such that the sensor defines a sensor region 226. The sensor region can be selected to correspond to a region that might be susceptible to wetting by a working fluid in the event of a leak.

FIGS. 8 and 9 show examples of a sensitive region defined by a leak sensor 225. The illustrated sensitive region 226 extends along the leak sensor (e.g., between points "A" and "B") routed on a surface of a printed circuit board 205. With circuits configured as shown in FIG. 8, the leak detector can be configured to interrupt a tachometer signal emitted by each pump 210 in response to a detected leak. Alternatively, each of the illustrated pumps 210 and the leak detector circuit 225 can be configured to emit one or more simulated fan-tachometer signals corresponding to one or more respective observed operational states. The one or more simulated fan-tachometer signals can be transmitted over the illustrated fan headers 231, for example, to an IPMI bus. A controller can receive and interpret the one or more signals as a proxy for the observed operational state, and responsively issue one or more corresponding system commands.

In FIG. 9, the leak detector circuit 225' is configured to interrupt a simulated tachometer signal in response to a detected leak. Such interruptions can simulate a tachometer signal emitted by a fan having a "locked rotor." A corresponding control system configured to monitor a tachometer signal emitted from a fan can respond to a simulated "locked rotor" signal by initiating an alert or other system command.

Overview of Flow Sensors

Figure 10:
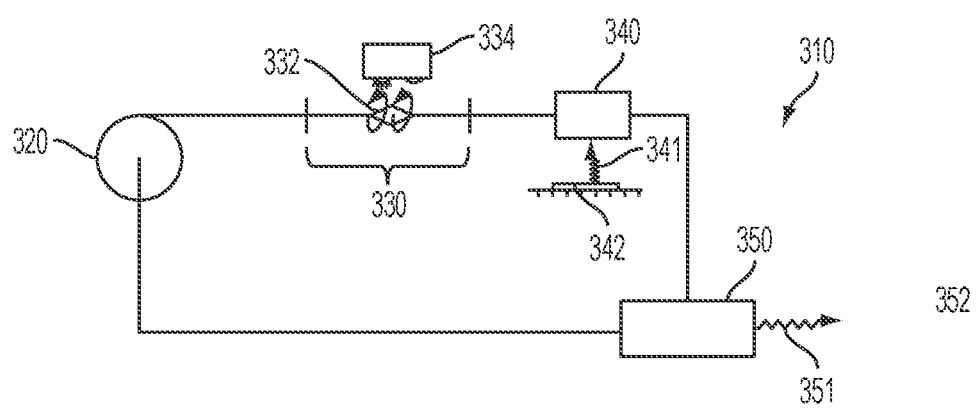
FIG. 10 shows a schematic illustration of a cooling system having an optical flow-rate sensor of the type disclosed herein.

FIG. 10 illustrates a fluid circuit 310 having a pump 320, an optical flow-rate sensor 330, a heat exchanger 340 configured to transfer heat 341 from a heat dissipating component (e.g., a microprocessor), and a radiator 350 configured to dissipate heat 351 from the working fluid to an environment 352. In some fluid circuits, the pump 320 and the heat exchanger 340 are combined into an operative subassembly, as described by way of example in U.S. patent application Ser. No. 12/189,476, among other patent applications.

A flow-rate sensor 330 can include a rotational member 332 positioned within a segment of conduit 331 and a tachometer 334 configured to detect a rotational speed of the rotational member. As shown schematically in FIG. 11, the rotational member 332 can be configured to receive momentum from a flow of a working fluid passing over the rotational member, in a manner similar as a turbine of a windmill receiving momentum from a flow of air passing over the turbine. A rotational member 332 of the type disclosed herein can include a generally axisymmetric arrangement of wings, foils, blades, faces, or screws positioned within a conduit suitable for conveying a flow of a working fluid such that a flow of a selected fluid passing over the arrangement of wings, foils, blades, faces, or screws applies a torsional force to the rotational member to urge the rotational member in rotation about the axis of rotation.

Figure 13:
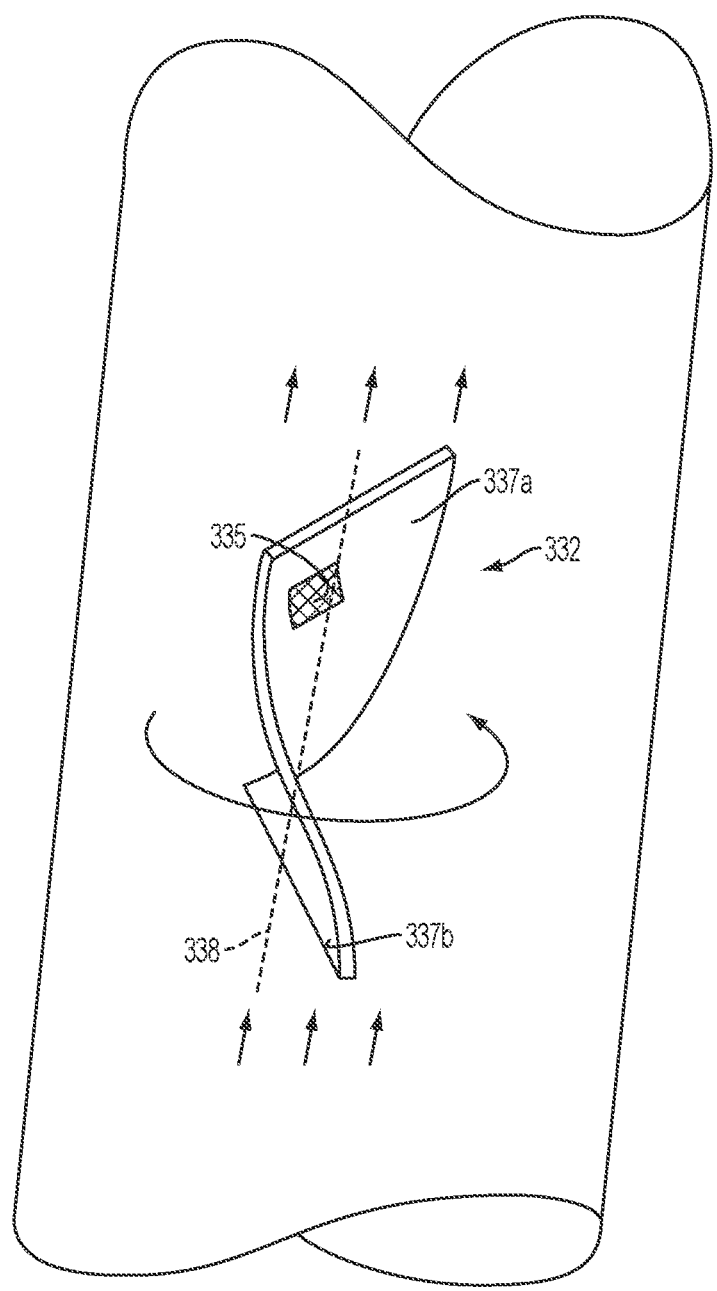
FIG. 13 shows one possible configuration of a rotational member as disclosed herein.

Some body portions comprise a thin shell member having opposed first and second sides 337a, 337b. As shown in FIG. 13, a thin shell member can define a primary axis 338 extending longitudinally of the shell member and a secondary axis 338a extending transversely relative to the primary axis. The thin shell member can be twisted about the primary axis 338 so as to define a foil-shaped member configured to convert momentum from a passing fluid to a torsional force applied to the thin shell member. FIG. 13 shows but one possible example of such a foil-shaped member.

A torsional force applied to the rotational member (e.g., member 332) can correspond to a rate of flow of a working fluid past the rotational member, with higher flow rates corresponding to relatively higher torsional forces. For example, a lift force on a wing in a stream of an incompressible fluid can increase in proportion to the square of the speed of the approaching fluid. A lift force applied to the rotational member 332 at a position spaced apart from a central, longitudinal axis 338 applies a turning moment (e.g., a torque, or a torsional force) to the rotational member about the axis 338. The turning moment can urge the rotational member 32 in rotation. In some axisymmetric embodiments of rotational members 332, the turning moment can urge the rotational member 332 in rotation about the central, longitudinal axis 338. The turning moment can correspond to the lift force (torsional force) generated by the flow of the working fluid past the rotational member. Moreover, the speed of rotation of the rotational member 332 can correspond to the torsional force applied to the rotational member. Accordingly, the rotational speed of the rotational member can correspond to the speed of an approaching flow of the fluid. And, a volumetric flow rate (or a mass flow rate) of the fluid through a closed conduit corresponds to the speed of the fluid through the conduit.

Thus, a rotational speed of the rotational member 332 positioned within a fluid conduit can correspond to a volumetric flow rate (or mass flow rate) of a fluid through the conduit 331. Although determining an algebraic expression for a relationship between rotational speed of a given rotational member in a flow of a selected fluid might be possible, such a relationship or correlation can be determined experimentally for each combination of rotational member configuration, conduit configuration, and working fluid.

Figure 14:
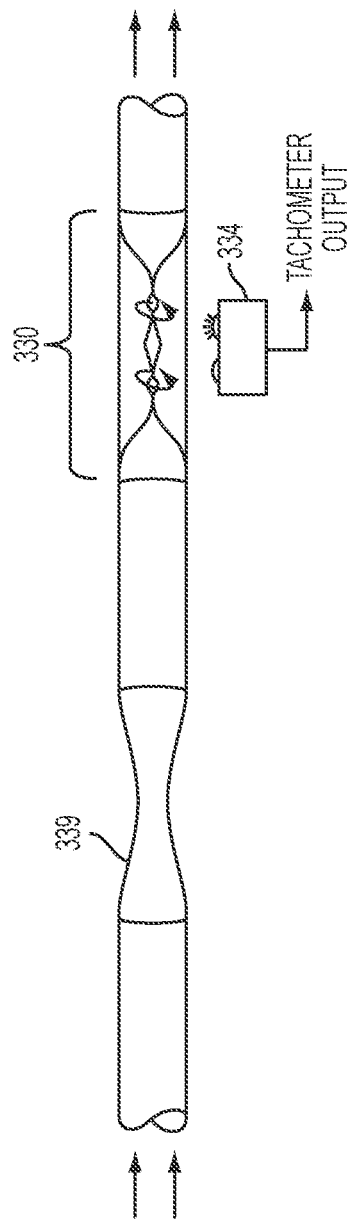
FIG. 14 shows a schematic illustration of an apparatus configured to calibrate a flow-rate sensor of the type shown in FIG. 13.
Figure 15:
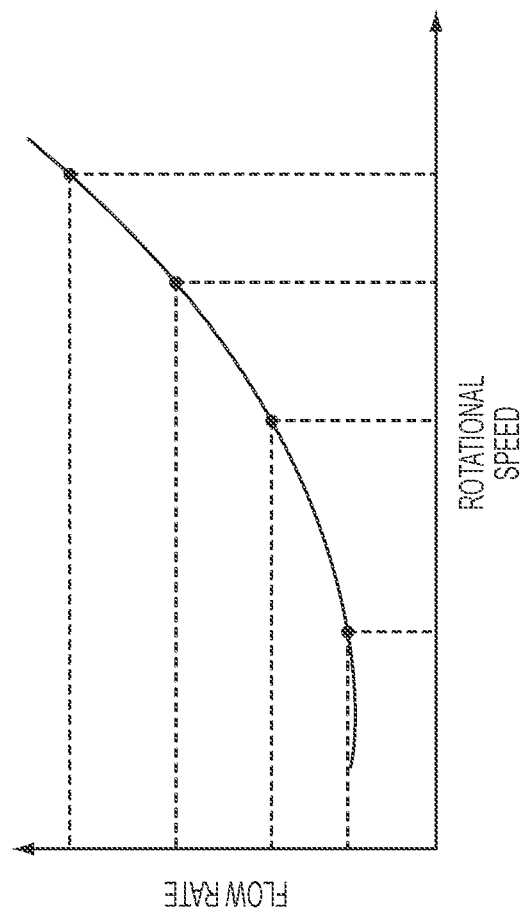
FIG. 15 shows a plot of a calibration of a flow-rate sensor.

Though not to scale, the plot in FIG. 15 generally illustrates one example of a correlation between an observed rotational speed of the rotational member 332 and a (volumetric or mass) flow-rate past the rotational member. An apparatus of the type shown in FIG. 14 can be used to assess such a correlation and to generate such a plot.

For example, a conventional flow-rate sensor (e.g., a Venturi-type sensor) can be used to determine each of several selected (mass or volumetric) flow rates of a working fluid, and the tachometer can emit a signal indicative of the rotational speed of the rotational member at each respective flow rate. Each flow-rate/rotational speed pair of readings can be plotted as indicated by the plot shown in FIG. 15, to reveal an experimentally determined correlation between rotational speed of the rotational member 332 and fluid flow rate through the conduit, for a particular combination of rotational member configuration, conduit configuration, and working fluid. In general, a unique correlation between rotational speed of the rotational member and flow rate of working fluid exists for each combination of working fluid, rotational member configuration, and conduit configuration. However, once a correlation between (volumetric or mass) flow rate and rotational speed is determined for a selected combination of conduit configuration, rotational member configuration, and working fluid, the rotational speed of the rotational member can be observed, and, based on the correlation of flow-rate through the conduit segment 332 and rotational speed of the rotational member, the corresponding flow rate (e.g., volumetric or mass flow rate) can be determined.

The tachometer can include any of a variety of known and hereafter developed sensor arrangements suitable to detect a rotational speed of the rotational member 331. As but one example, a suitable tachometer can include an optical sensor having an emitter, a detector, and a counter.

For example, the rotational member 332 can be positioned in a conduit 331 having a transparent outer wall 331a, or other suitable port configured to permit a selected frequency range (or band) of electromagnetic radiation (e.g., radiofrequency, X-rays, or light in the infrared, visible, or ultraviolet spectra) to pass therethrough. Although many suitable emitter and detector configurations are possible, the following discussion will refer to the emitter as a light emitter and the detector as a light detector by way of example, and not limitation, for ease of description.

In some embodiments of flow sensors, a light emitter 333 can emit light (e.g., for a duration substantially longer than a period of rotation for the rotational member 332) in a direction toward the rotational member 332, and one or more portions 335 of the rotational member can reflect incident light (or other radiation band) from the emitter 333 toward the light detector 336. The counter 337 can increment a count each time the light detector 336 detects light reflected by the reflective portion 335 of the rotational member 332. Such detection can be responsive to a detected presence of light compared to a detected absence of light, or to a detected absence of light compared to a detected presence of light. With such an arrangement, a rate at which the count increases (e.g., a time-rate-of-change of the count) can correspond to a rate at which the light detector 336 detects a reflection of light from the rotational member 332. In turn, the rate at which the light detector 336 detects a reflection of light from the rotational member 332 can correspond to a rotational speed (i.e., a frequency of rotation, or an angular speed) of the rotational member 332, and thus, as noted above, a rate of flow of a working fluid through a selected conduit.

For example, the rotational member 332 can be configured to reflect incident light toward the detector 336 once per revolution of the rotational member about the axis of rotation, as with the member 332 shown in FIGS. 13, 16A and 16B. As but one example, the rotational member 332 can have a relatively less reflective body portion 337a, 337b that rotates about an axis of rotation 338 and a relatively more reflective reflector portion 335 affixed to or on, or integral with, the relatively less reflective body portion 337a, 337b. The reflector portion 335 can be so arranged as to reflect light toward the detector 336 once during each revolution of the body portion 332.

The reflector portion 335 can comprise a reflector member positioned on one of the opposed sides 337a, 337b of the thin shell member shown in FIGS. 13, 16A and 16B. With such an arrangement, a rate (or a frequency) at which the count increments in response to detected reflections from the reflector portion 335 can approximate the angular speed of the rotational member, which in turn can correspond to a rate of flow of a working fluid through the conduit 331.

As another example, the rotational member 332 can be configured to reflect incident light toward the detector 336 twice per revolution of the rotational member about the axis of rotation. For example, the rotational member 332 can comprise opposed first and second reflective portions (not shown) so arranged relative to the opposed faces 337a, 337b that each of the first and the second reflective portions reflects light toward the detector 36 once during each revolution of the rotational member (i.e., such that light is reflected toward the detector 36 twice per revolution of the rotational member). With such an arrangement, one-half of a rate (or a frequency) at which the count increments in response to detected reflections from the first and the second reflector portions can approximate the angular speed of the rotational member, which in turn can correspond to a rate of flow through the conduit.

In general, the rotational member 332 can be configured to reflect incident light toward the detector N times per revolution of the rotational member about the axis of rotation. With such an arrangement, 1/N of a rate (or a frequency) at which the count increments in response to detected reflections from the rotational member can approximate the angular speed of the rotational member, which in turn can correspond to a rate of flow through the conduit.

FIG. 12 shows a particular exemplary embodiment of a flow-rate sensor 330 of the type described above. The illustrated sensor 330 has a transparent (in relation to a selected spectrum of incident electromagnetic radiation) segment 336 of conduit with a rotational member 332 positioned therein. A tachometer 334 is positioned externally of the conduit and is arranged to emit light (or other band of radiation) through the transparent segment 36 and toward the rotational member 332. The tachometer 334 is further arranged to detect light (or other radiation) reflected by the rotational member 332 through the transparent segment 336.

The illustrated sensor 330 also has a retainer 360 configured to suspend the rotational member 332 within the conduit 31 in spaced relation from an interior wall 331b of the transparent segment of conduit. Such a suspended arrangement can permit the rotational member 332 to rotate about a selected axis of rotation 338 within the conduit 331 and without being carried away by a flow of a working fluid passing through the conduit.

The retainer 360 can include an upstream retainer member 361 and a downstream retainer member 362. One or both of the retainer members 361, 362 can be configured to urge outwardly against an inner wall 331b of the segment 331a of conduit. In some embodiments, one or both retainer members 361, 362 comprise an elongate member that resiliently urges against the wall 331b, as shown in FIG. 12.

In some embodiments, one or both retainer members 361, 362 include a segment 363 configured to matingly engage with a correspondingly configured region of the inner wall 331b of the conduit 331a. As FIG. 12 shows, the segment 363 configured to matingly engage with the inner wall 331b can include a bent segment 364 of wire configured to rest within a corresponding détente 365, or other recessed region of the inner wall 331b.

The rotational member 332 can be rotatably coupled to the retainer 360. For example, a first swivel member 366a can rotatably couple the rotational member 35 to an upstream retainer member 361 and a second swivel member 366b can rotatably couple the rotational member 335 to a downstream retainer member 362, as shown in FIG. 11.

The conduit 331a having a rotational member 32 positioned therein can be fluidly coupled in series (or "in-line") with one or more other components of a fluid circuit 310. Such a placement of the conduit 331a can facilitate measurement of a rate of flow of a working fluid through the one or more components, once a correlation (e.g., FIG. 15)

between observed rotational speed of the rotational member 332 and a volumetric (or mass) flow rate of the working fluid through the conduit 331a has been determined.

A flow sensor 330 of the type described herein can be incorporated in a cooling system, such as, for example, a cooling system configured to cool an electronic component or other device that dissipates waste heat during operation. As noted above, a tachometer output of such a flow sensor can indicate a rate of fluid flow through the sensor.

In some embodiments, the output of the tachometer 334 can be multiplexed so as to be compatible with a known or installed communication bus, e.g., over an IPMI bus. As noted above, a computer system incorporating a cooling system can include a controller configured to transmit an alert or other command in response to an observed signal exceeding a selected upper threshold or falling below a selected lower threshold. The observed signal can be emitted by a flow sensor. In some instances, the emitted signal can be emitted by a tachometer 334 configured to observe a rotational speed of a rotational member 332, and the control system can transmit an alert or other command in response to an observed tachometer signal exceeding a selected upper threshold or falling below a selected lower threshold. The upper or lower threshold can correspond to an upper or a lower fluid flow-rate threshold.

Figure 17:
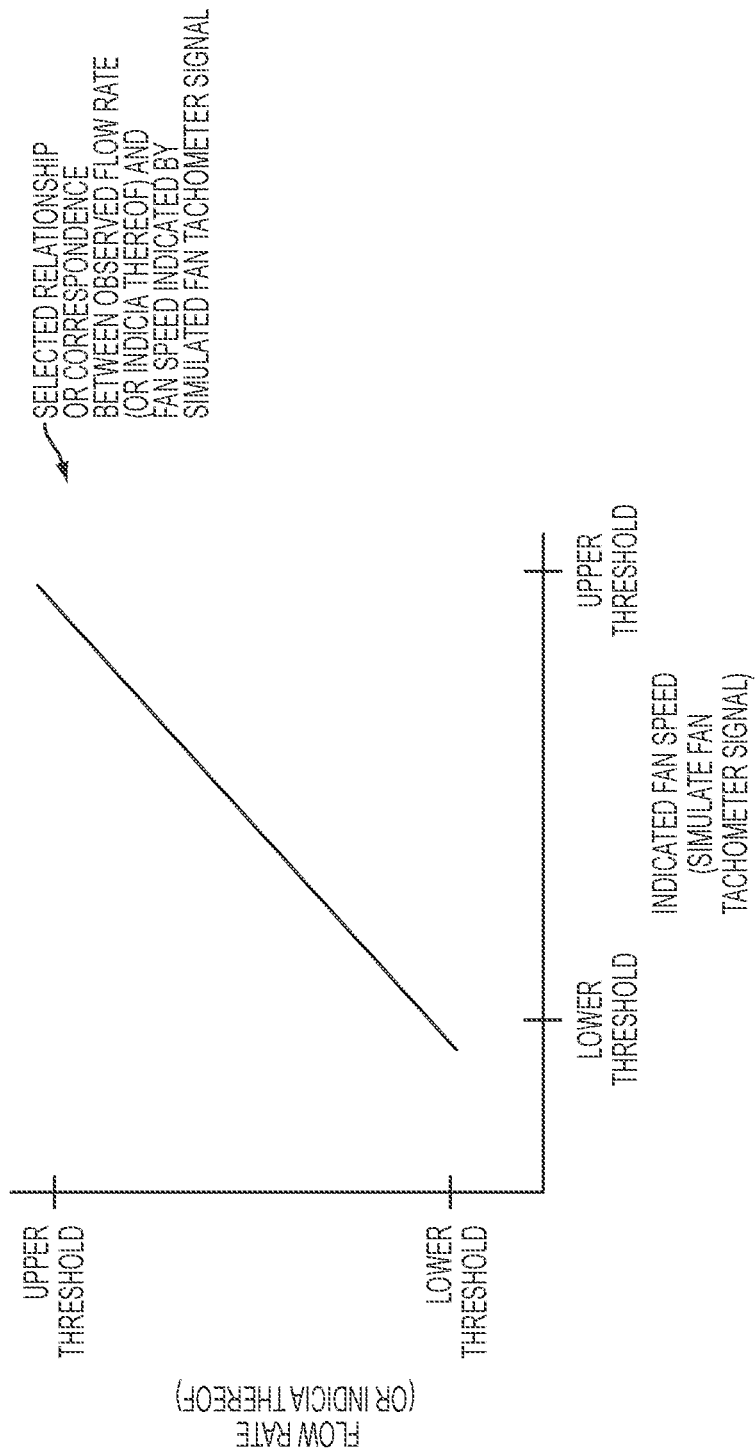
FIG. 17 shows a selected proxy relationship (or correlation) between an observed flow rate of a working fluid (or indicia thereof) and a fan speed indicated by a simulated fan-tachometer signal.

As well, or alternatively, a flow-rate sensor, e.g., an optical flow-rate sensor 330 of the type described herein, can emit a simulated fan-tachometer signal in correspondence with an observed flow rate (or indicia thereof). For example, until a lower threshold flow rate (or indicia thereof) is observed by the flow-rate sensor, the sensor can emit a simulated fan-tachometer signal indicative of a given condition of a fan, for example, a stalled fan rotor. Between the lower threshold flow rate (or indicia thereof) and a selected upper threshold observed flow rate (or indicia thereof), the sensor can emit a corresponding simulated fan-tachometer signal indicative of a selected fan speed. As but one example, a correlation can be defined between simulated fan-tachometer speed and observed flow rate (or indicia thereof) between selected upper and lower threshold flow rates (or indicia thereof), as shown in FIG. 17. With such a pre-defined correlation, the sensor 330 can emit a simulated fan-tachometer signal correlated to (or encoding) a flow rate (or indicia thereof) observed by the sensor. The simulated fan-tachometer signal can be conveyed over a known bus using known protocols (e.g., an IPMI bus) and observed by a control system. The control system, in turn, can decode the simulated fan-tachometer signal using the known correlation (FIG. 17) between observed flow rate (or indicia thereof) and simulated fan speed.

Some flow-rate sensors can have an electrical circuit operatively coupled to an FG signal pin of a header and be configured to emit a simulated tachometer signal having a waveform similar to a waveform emitted by an operating (or stalled) fan. The electrical circuit (not shown) can be further configured to emit a simulated tachometer signal having a waveform similar to a failed or failing fan in response to an observed flow rate (or indicia thereof) below a selected lower threshold.

A flow-rate sensor can be operatively coupled to a control system associated with one or more pumps of the liquid-based heat-transfer system. The control system can emit a control signal for adjusting operation of one or more pumps in the fluid circuit (e.g., a cooling system) responsively to an observed proxy (or other) signal emitted by a flow-rate sensor.

For example, if the signal emitted by the flow-rate sensor indicates a lower-than-desired flow rate (e.g., based on an observed system workload, such as a microprocessor workload, or read/write traffic across a memory bus), the control system can emit a control signal. Such a control signal can cause a given one or more pump to increase speed, can cause a supplemental pump to become operational, and/or can cause a valve to open (or close), to increase flow rate through a desired portion of a cooling system. Such a control signal can alter an operational state of a computer system. For example, if additional system cooling is unavailable by increasing pump speed, opening a valve, or operating a supplemental pump, the computer system can reduce or limit workload of a subsystem at risk of overheating (e.g., microprocessor workload can be limited or reduced, read/write traffic across a memory bus can be limited or reduced) absent increased cooling.

As another example, if the signal emitted by the flow-rate sensor indicates a higher-than-necessary flow rate (e.g., based on an observed system workload, such as a microprocessor workload, or read/write traffic across a memory bus), the control system can emit a control signal. Such a control signal can cause a given one or more pumps to decrease speed (e.g., to save power and/or lower acoustic emissions by the pump), cause a supplemental pump to slow down or to stop operating, and/or cause a valve to open (or close), decreasing flow rate through a portion of a cooling system to a suitable level.

Other Multiplexed Proxies

As one generalized example, a sensor circuit can be configured to emit a proxy signal corresponding to an observed operational state. Each in a plurality of discrete proxy signals can correspond to each respective observed operational state in a plurality of observable operational states.

In some instances, such a proxy signal can be a simulated fan-tachometer signal. Each discrete simulated fan-tachometer signal can correspond to a respective observed operational state. For example, a simulated fan-tachometer signal corresponding to a fan speed of 200 RPM can constitute a proxy for a selected observed flow rate (or indicia thereof, such as, for example, a rate of increasing count of detected reflections from a reflective portion 35 of a rotational member 32). With such an example, a simulated fan-tachometer signal corresponding to a different fan speed (e.g., 250 RPM) can constitute a proxy for another (e.g., higher) observed flow rate (or indicia thereof) within the system 10.

As another example, a simulated fan-tachometer signal corresponding to a fan speed of 200 RPM can constitute a proxy for an observed first flow rate at a location within the system and a simulated fan-tachometer signal corresponding to a fan speed of 250 RPM can constitute a proxy for an observed second (e.g., different) flow rate. FIG. 17 shows an example, pre-defined correlation between simulated fan-tachometer signal and flow rate.

In some instances, a simulated fan-tachometer signal corresponding to a fan speed of 200 RPM can constitute a proxy for an observed leak at a first location within the system and a simulated fan-tachometer signal corresponding to a fan speed of 250 RPM can constitute a proxy for an observed leak at a second (e.g., different) location within the system.

Such proxy signals can be transmitted over and observed from, for example, the IPMI bus. A controller operatively coupled to the IPMI bus can observe the proxy signal, interpret the observed proxy signal, as by comparison to a lookup table, and, if appropriate, issue one or more selected system commands responsively to the observed or interpreted proxy signal.

By way of illustrate of disclosed principles, the following table summarizes specific examples of proxy signals, proxy signal values and corresponding operational states represented by the proxy signal values:

| PROXY SIGNAL | PROXY SIGNAL VALUE | CORRESPONDING OPERATIONAL STATE |
|---|---|---|
| simulated fan-tachometer signal | 200 rpm | Leak at position "A" in system |
| | 250 rpm | leak at position "B" in system |
| | 300 RPM | Pump 1 failure |
| | 350 RPM | Pump 1 operating normally |
| | 400 RPM | Pump 2 failure |
| | 450 RPM | Pump 2 operating normally |
| | 500 RPM | Observed temperature (e.g., temperature of electronic component, pump motor, liquid coolant or air) over selected threshold or within a predefined range |
| | 550 RPM | Observed temperature (e.g., temperature of electronic component, pump motor, liquid coolant or air) over another selected threshold or within a different predefined range |

Computing Environments

Figure 18:
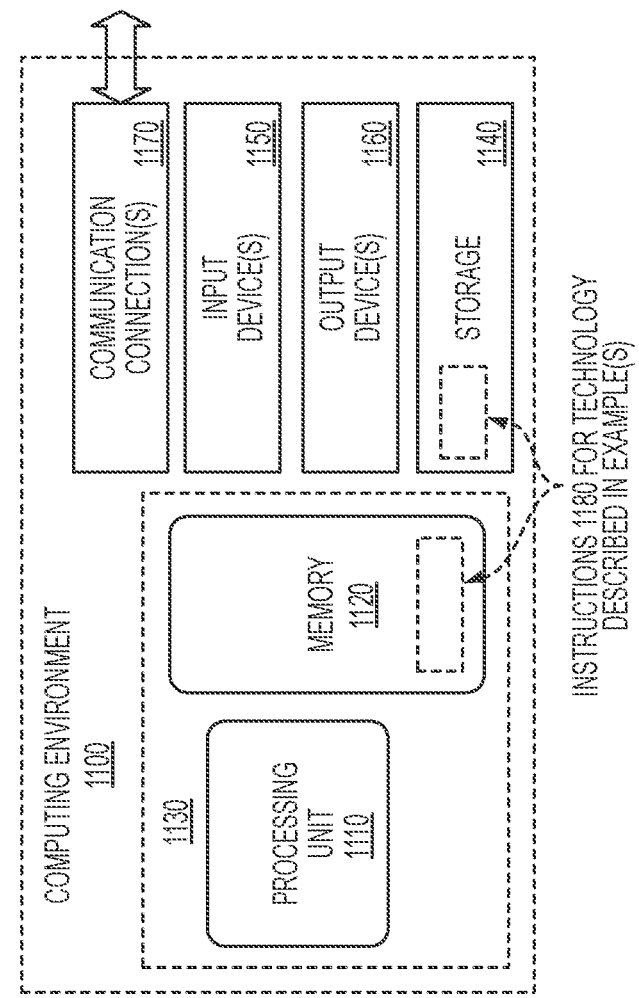
FIG. 18 shows a block diagram of a computing environment suitable for use in combination with systems, methods and apparatus described herein.

FIG. 18 illustrates a generalized example of a suitable computing environment 400 in which described methods, embodiments, techniques, and technologies relating, for example, to detection and/or removal of unwanted noise signals from an observed signal can be implemented. The computing environment 1100 is not intended to suggest any limitation as to scope of use or functionality of the technologies disclosed herein, as each technology may be implemented in diverse general-purpose or special-purpose computing environments. For example, each disclosed technology may be implemented with other computer system configurations, including wearable and handheld devices (e.g., a mobile-communications device, or, more particularly but not exclusively, IPHONE®/IPAD® devices, available from Apple Inc. of Cupertino, Calif.), multiprocessor systems, microprocessor-based or programmable consumer electronics, embedded platforms, network computers, minicomputers, mainframe computers, smartphones, tablet computers, data centers, and the like. Each disclosed technology may also be practiced in distributed computing environments where tasks are performed by remote processing devices that are linked through a communications connection or network. In a distributed computing environment, program modules may be located in both local and remote memory storage devices.

The computing environment 1100 includes at least one central processing unit 1110 and memory 1120. In FIG. 18, this most basic configuration 1130 is included within a dashed line. The central processing unit 1110 executes computer-executable instructions and may be a real or a virtual processor. In a multi-processing system, multiple processing units execute computer-executable instructions to increase processing power and as such, multiple processors can run simultaneously. The memory 1120 may be volatile memory (e.g., registers, cache, RAM), non-volatile memory (e.g., ROM, EEPROM, flash memory, etc.), or some combination of the two. The memory 1120 stores software 1180a that can, for example, implement one or more of the innovative technologies described herein, when executed by a processor.

A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The store 1140 may be removable or non-removable, and can include selected forms of machine-readable media. In general, machine-readable media includes magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information and which can be accessed within the computing environment 1100. The storage 1140 stores instructions for the software 1180b, which can implement technologies described herein.

The store 1140 can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hardwired circuit components.

The input device(s) 1150 may be a touch input device, such as a keyboard, keypad, mouse, pen, touchscreen, touch pad, or trackball, a voice input device, a scanning device, or another device, that provides input to the computing environment 1100. For audio, the input device(s) 1150 may include a microphone or other transducer (e.g., a sound card or similar device that accepts audio input in analog or digital form), or a computer-readable media reader that provides audio samples to the computing environment 1100.

The output device(s) 1160 may be a display, printer, speaker transducer, DVD-writer, or another device that provides output from the computing environment 1100.

The communication connection(s) 1170 enable communication over a communication medium (e.g., a connecting network) to another computing entity. The communication medium conveys information such as computer-executable instructions, compressed graphics information, processed signal information (including processed audio signals), or other data in a modulated data signal.

Thus, disclosed computing environments are suitable for transforming a signal corrected as disclosed herein into a human-perceivable form. As well, or alternatively, disclosed computing environments are suitable for transforming a signal corrected as disclosed herein into a modulated signal and conveying the modulated signal over a communication connection Machine-readable media are any available media that can be accessed within a computing environment 1100. By way of example, and not limitation, with the computing environment 1100, machine-readable media include memory 1120, storage 1140, communication media (not shown), and combinations of any of the above. Tangible machine-readable (or computer-readable) media exclude transitory signals.

Couplers

Figure 19:
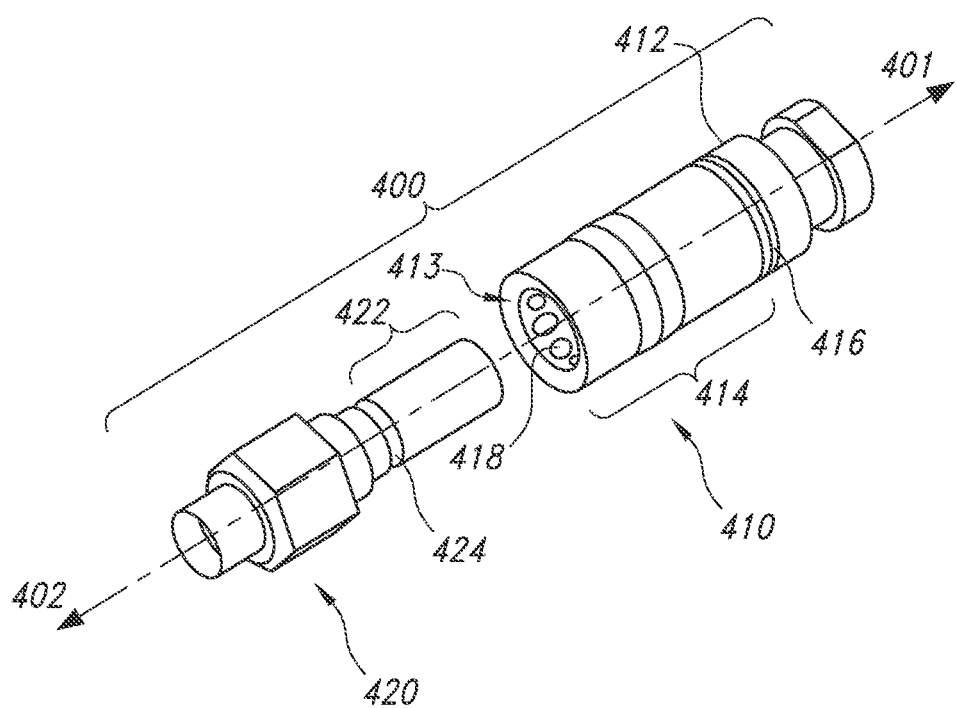
FIG. 19 illustrates a coupler of the type disclosed herein.

FIG. 19 shows a photograph of one embodiment of a two-member coupler. The fluid coupler 400 has a first member 410 configured to matingly couple with and to decouple from a second member 420 to provide a decoupleable coupling between a corresponding first fluid conduit 401 and a corresponding second fluid conduit 402. Such a coupling is depicted, for example, schematically at inlets 150a-n and outlets 140a-n in FIG. 6 in U.S. patent application Ser. No. 13/559,340. To inhibit a leak of fluid from the coupler 400 when coupling or decoupling the first and the second members 410, 420 to or from each other, one or both of the members 410, 420 can have an internal valve that automatically closes before, during or after the members 410,420 are decoupled from each other and automatically opens before, during or after the members are coupled to each other.

For example, a first member 410 can define an open interior bore 413 sized to receive a shank 422 extending from the second member 420. Either or both members 410, 420 can define an interior valve that opens after the bore 413 matingly and/or sealingly engages the shank 422. For example, an interior wall of the bore 413 can have a pliable gasket (e.g., an O-ring) extending circumferentially around the bore and positioned at a selected first depth within the bore. The gasket can be configured relative to the shank (e.g., a diameter thereof) to sealingly engage with an outer surface of the shank 422 as the shank slides into the bore 413 to a depth greater than the selected first depth. As the shank slides deeper into the bore, a portion within the bore 413 can urge against a portion of the shank to open either or both valves corresponding to the respective members 410, 420 and thereby to fluidicly couple the first conduit 401 with the second conduit 402.

Such automatic actuation of the valves can result from a resiliently compressible member (e.g., a spring, not shown). For example, the valve can be closed in an "at-rest" position when urged by a corresponding resiliently compressible member. The coupling members 410, 420 can define correspondingly configured features that urge the valve open against the force applied by the resiliently compressible member as the members 410, 420 are brought into a mating engagement. With such an automatically actuatable valve, the coupler members 410, 420 can inhibit fluid leaks when coupling or decoupling the coupler members 410, 420.

As well, a compressive force applied between the members 410, 420 that actuates the valve by overcoming a force of a resilient member, as just described, can compress such a resilient member. The compressed resilient member can urge the members 410, 420 apart from each other when the compressive force is removed.

However, the coupler 400 can also have a retainer configured to retain the decoupleable coupling between the first member 410 and the second member 420 against the outwardly applied force of the compressed resilient member. However, when a retention force applied by the retainer to the first and the second members 410, 420, the compressed resilient member can urge the first member 410 and the second member 420 apart with sufficient force as to cause the coupled members 410, 420 to decouple from each other and thereby to automatically close the respective valves.

The retainer depicted in FIG. 19 includes a cylindrical sleeve 414 overlying a body 412 of the first member 410, a plurality of bearings positioned at discrete circumferential positions relative to the bore 413, as well as a groove 424 positioned proximally of the shank 422 of the second member 420. When the first and the second members 410, 420 are matingly engaged with each other, the bearings 418 rest within the groove 424. The wall of the groove urges against the bearings when the mated first and the second members 410, 420 are urged together in compression or pulled apart in tension, and the sleeve 414 overlying the bearings prevents the bearings 418 from moving radially outward from the bore 413, locking the first and the second members 41, 420 together.

The sleeve 414 can slide longitudinally to and fro relative to the body 412 from a retention configuration, as shown in FIG. 19 to an engagement/disengagement configuration (not shown). In the engagement/disengagement configuration, the sleeve 414 longitudinally retracts from the depicted retention configuration until the sleeve urges against a shoulder 416 defined by the body 412. When the sleeve 414 is retracted, the bearings 418 can move radially outward relative to the bore 413, allowing the members 410, 420 to separate from each other as they are pulled apart.

The illustrated sleeve defines an outer surface and a circumferentially extending groove recessed from the outer surface. The groove facilitates gripping by a user's hand when retracting the sleeve 414 relative to the body 412. As well, the coupler member 410 includes a resilient member (e.g., a spring, not shown) configured to resiliently urge the sleeve 414 toward the retention configuration shown in FIG. 19. To retract the sleeve to the engagement/disengagement configuration, the force of the resilient spring and any friction as between the sleeve and the body 412 needs to be overcome. Once the sleeve is partially or fully retracted from the illustrated retention configuration, the resilient member urges the sleeve 414 toward the retention configuration. In many embodiments, the force applied to the sleeve by the resilient member sufficiently exceeds any frictional force between the sleeve 414 and the body 412 to allow the sleeve 414 to automatically return to the illustrated retention configuration. As described more fully below, the force applied to the sleeve 414 by the resilient member sufficiently exceeds such frictional forces as well as other forces, e.g., servo or other actuator resistance when the servo or other actuator is not actuated. The working embodiment shown in FIG. 20 includes automatically decoupleable couplers similar in arrangement to the coupler 400 shown in FIG. 19 and described above.

Figure 20:
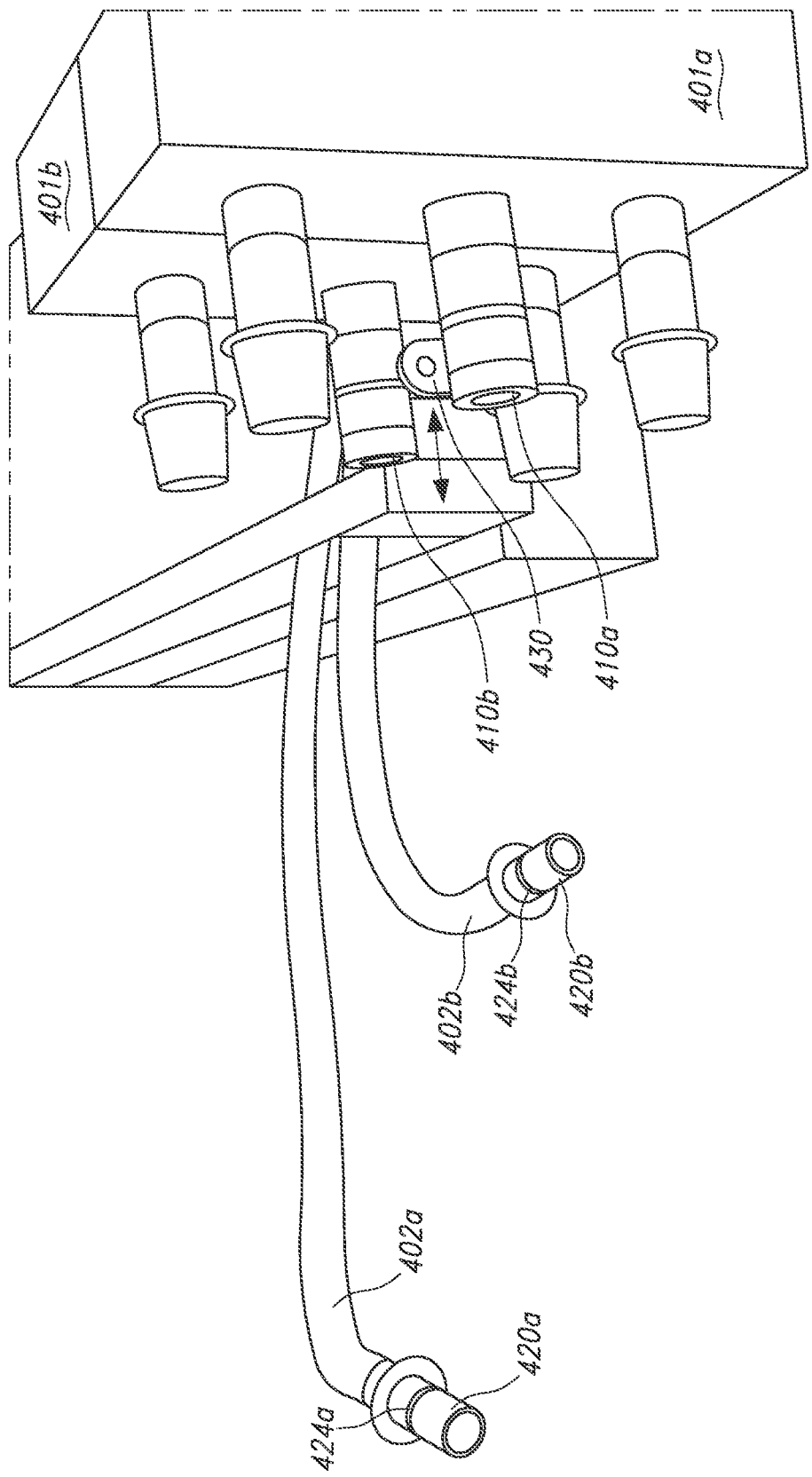
FIG. 20 contains a photograph of a working embodiment of a cooling system having automatically decoupleable couplers of the type shown in FIG. 19.

The cooling system shown in FIG. 20 is similar to a cooling system disclosed, for example, in U.S. patent application Ser. No. 13/559,340, filed Jul. 26, 2012, and the applications from which the '340 Application claims priority, each of which patent applications is hereby incorporated by reference as if recited in full herein. For example, referring to FIG. 20, the distribution manifold 401b has several coupler members 410b configured to couple with corresponding coupler members 420b affixed to an inlet conduit 402b. At an end of the conduit 402b positioned opposite the coupler member 420b, the conduit is coupled to a cold plate to deliver coolant to the cold plate from the distribution manifold 410b. Similarly, the collection manifold 401a has several coupler members 410a configured to couple with corresponding coupler members 420a affixed to an outlet conduit 402a. At an end of the conduit 402a positioned opposite the coupler member 410a, the conduit 402a is coupled to a corresponding cold plate to receive heated coolant from the respective cold plate. The working embodiment has first and second cold plates, and the conduit 402b is coupled to the first cold plate and the conduit 402a is coupled to the second cold plate. In other embodiments, however, the conduits 402a, 402b are coupled to the same cold plate. Still other embodiments have more than two cold plates and the conduits 402a, 402b are coupled to respective cold plates and the remaining cold plates are coupled to the respective cold plates fluidicly between the conduits 402a, 402b.

The working embodiment also includes an actuator shaft 430 mechanically coupled with the sleeves 414 of the coupler members 410a, 410b. Such mechanical coupling can be any form of coupling or linkage sufficient to permit the actuator shaft 430 to longitudinally slide the sleeves 414 to retract the sleeves from overlying the bearings and thereby to permit the coupler members 410a, 410b to decouple from each other.

As the white double-headed arrow indicates, the actuator shaft 430 can linearly translate generally perpendicularly to the manifolds 401a, 401b and generally parallel to a longitudinal axis of the coupler members 410a, 410b. As the actuator shaft 430 retracts toward the manifolds 401a, 401b with a force sufficient to overcome friction between the sleeves 414 and the corresponding bodies 412, as well as the force applied by the resilient member, the sleeves 414 of the respective coupler members 410a, 410b also retract, permitting the bearings 418 (FIG. 19) to move radially outward of the bore 413 (FIG. 19) and the shank 422 to eject from the bore, as shown in FIG. 20. In some embodiments, including in the working embodiment, the coupler members 410a, 410b separate automatically under the force of the resilient member that urges the valves closed when the retainer sleeve 414 retracts sufficiently to permit the bearings to move radially outward. In FIG. 20, the actuator shaft 430 has returned to an unactuated, extended position in which the sleeves 414 overlie the bearings 418, after the shaft 430 retracted the sleeves 414 to automatically eject the coupler members 420a, 420b.

In the embodiment shown in FIG. 20, the actuator shaft is mechanically coupled to two sleeves 414. In other embodiments, each activator shaft can be coupled to only one sleeve or more than two sleeves. For example, some servers can have more than one inlet conduit 402b and/or more than one outlet conduit 402a, and one actuator shaft can be configured to retract each sleeve 414 corresponding to all inlet and outlet conduits for a give server. In still other embodiments, one actuator shaft 430 is mechanically coupled to each of one or more inlet conduits for a given server and another actuator shaft is mechanically coupled to each of one or more outlet conduits for the given server.

A servo, a stepper-motor, or other electro-mechanical actuator (not shown) can urge the actuator shaft 430 or other linkage to translate in space from a first position to a second position. The first position can correspond to a retention configuration of a coupler of the type described herein and the second position can correspond to an engagement/disengagement configuration of the coupler (e.g., with the sleeve 414 retracted toward the shoulder 416). The servo or other actuator can be activated by a controller responsively to a change in an observed state of an operational parameter. For example, a controller can activate the servo or other actuator responsively to an alert or other command issued by a control system, or (e.g., with a latching control system) responsively to an absence of an alert or other command.

As but one example, the conduits 402a, 402b corresponding to a cooling system for a given server can be automatically disconnected from the manifolds 401a, 401b in response to a leak being detected within the given server, while all other servers in the rack can remain operational. For example, each server can have one or more corresponding leak sensors, e.g., of the type described herein, and each leak sensor can have a unique identifier (e.g., address). In some instances, including the working embodiment, the leak sensor is configured as a repositionable cable that can be positioned within a given server at one or more selected positions reasonably calculated by a user to be exposed to a cooling-system leak. Each leak sensor can be coupled to a controller configured to interpret an output signal from the leak (or other) sensor. The controller can have a look up table or other reference for establishing correspondence between each of several leak (or other) sensors and the server in or on which each leak sensor is positioned.

As well, each actuator shaft 430 (or corresponding actuator) can have a unique identifier, and another look up table or other reference can establish correspondence between each of several actuators and one or more servers. Accordingly, when the control system detects a leak (or other change of state) in a given server, the control system can identify the given server (or location in a given server), issue an alert identifying which one or more selected actuators should be activated, e.g., to automatically decouple the conduits 402a, 402b from the manifolds 401a, 401b to prevent further leaking within the affected server. The controller can further activate the one or more identified actuators and thereby urge the actuator shaft 430 (or other actuator member) through a range of motion contemplated to remove a retention force applied to the coupling 400, as by retracting the sleeves 414. Other detected changes of state can also actuate an actuator, e.g., to allow an automatic disconnection from the manifolds. Such a change in state can include, for example, a detected coolant temperature above or below a selected threshold temperature, a detected power failure, an observed pressure exceeding an upper threshold pressure, etc.

In the working embodiment depicted in FIG. 20, the actuator shaft 430 extends from a two-position linear actuator. The linear actuator (not shown) retracts when supplied with power and thereby urges the sleeves 414 toward the engagement/disengagement configuration when activated. When not activated, the linear actuator applies little or no longitudinal load to the sleeves, allowing the sleeves to resiliently return to the retention configuration (e.g., as under forces applied by springs within the first member 410 (FIG. 19) configured to urge the sleeve 414 toward the retention configuration shown in FIG. 19. In other embodiments, the linear actuator can urge the actuator shaft 430 away from the actuator when supplied with power.

Referring again to FIG. 6 in U.S. patent application Ser. No. 13/559,340, an actuator as just described can be operably coupled to, for example, the inlet couplers 150a-n and/or the outlet couplers 140a-n. One or more leak detectors, flow rate sensors, and/or other sensors can be suitably arranged relative to each heat-transfer element 110a-n and corresponding operable devices that might be damaged from, for example, exposure to a leaked coolant or other working fluid. A controller as described herein can issue an alarm or a command to which the actuator can respond by urging, for example, the respective sleeves 414 toward the engagement/disengagement configuration. When the sleeve is sufficiently retracted, the compressive force applied to an internally positioned resilient member can be removed, causing the matingly engaged members 410, 420 to urge apart from each other as the resilient member returns to an uncompressed arrangement. An internal valve in each respective member 410, 420 can close to prevent leakage of a working fluid from the flow passages corresponding to the members 410, 420, thereby isolating the respective heat-transfer element(s) 110a-n from the remainder of the fluid circuit positioned among the various servers. Once a given branch of a heat-transfer system's fluid circuit has been isolated as just described, the corresponding equipment can be removed, inspected, and repaired without disrupting operation of adjacent equipment.

Any actuator suitable to retract one or more sleeves 414 can be used. Examples of suitable actuators include linear motors, linear servos, ball-screws coupled with a rotary motor or servo, four-bar linkages, among other types of linear actuators configured to urge the actuator shaft 430 through a range of motion sufficient to retract one or more sleeves 414.

Other arrangements of actuators and couplers are possible. For example, the couplers described thus far are coupleable and decoupleable by sliding the sleeve 414 in a longitudinal direction. However, some couplers are configured to decouple only after a member (e.g., a sleeve) rotates through a selected angle. In such an embodiment, a rotational actuator, stepper motor, or servo can be coupled to the rotatable member to automatically decouple the coupler. In still other embodiments, the coupler can require a combination of linear and rotational movement to automatically decouple the coupler. In such an embodiment, a two-degree-of-freedom actuator (e.g., an actuator or combination of actuators configured to urge a member in rotation and in linear translation) can be coupled to the coupler to automatically decouple the coupler.

Other apparatus and methods for isolating one or more branches of a fluid circuit of a heat-transfer system are possible. For example, referring to FIG. 21, a proportional or a zero-flow valve 502 can be positioned adjacent an inlet 150*a* to a branch (e.g., a heat-transfer element 110) of a fluid circuit in a heat-transfer system, and a check valve 501 can be positioned adjacent a corresponding outlet 140*a*. An actuator 503 of the type described herein can be operably coupled with the valve 502, as shown schematically in FIG. 21, and can cause the valve to open or close, entirely or partially, in response to an alarm or a command issued by a controller. On closing the valve 502, the check valve 501 can close to prevent a reversed flow (sometimes referred to in the art as "backflow") of working fluid through the outlet 140*a*. The closure of the valves 501, 502 isolate the branch (e.g., the heat-transfer element 110*a* in FIGS. 1, 2, 3, 5, and 6 of U.S. patent application Ser. No. 13/559,340) from the remainder of the heat-transfer system.

For conciseness and clarity, the foregoing describes isolation of a branch 110*a* of a heat-transfer system passing within a given server. Nonetheless, apparatus and methods just described can be suitable for isolating other branches of heat-transfer systems. For example, U.S. patent application Ser. No. 13/559,340 describes removing heat from a rack containing a plurality of servers by passing a facility coolant through a liquid-liquid heat exchanger. Depending on the plumbing arrangement of a given facility, a facility's coolant circuit can have a plurality of branches coupled to each other, for example, in parallel relative to a main conduit, similar to the arrangement of the plural heat-transfer elements 110*a*-*n* relative to each other and the manifold module 200 in FIGS. 5 and 6 in U.S. patent application Ser. No. 13/559,340. One or more such branches of a facility's coolant circuit can have a zero-flow or a proportional valve adjacent an inlet and a check valve positioned adjacent an outlet, and an electro-mechanical actuator can be operatively coupled to such zero-flow or proportional valve. The electro-mechanical actuator can be activated responsively to an alert or other command to close the corresponding valve, thereby isolating the corresponding branch from the facility's coolant circuit.

Other Exemplary Embodiments

The examples described herein generally concern control systems, with specific examples of control systems being configured to respond to a detected condition or operational state of a liquid-based heat-transfer system, e.g., to issue an alert or other command responsive to a detected leak of a working fluid or to issue an alert or other command responsive to an observed flow rate of a working fluid. Other aspects are described, as well. For example, electro-mechanical actuators arranged to isolate one or more corresponding branches of a fluid circuit are described. As but one other example, a pump speed can be adjusted responsive to a signal emitted by a flow-rate sensor. The signal can be indicative of an observed flow rate of working fluid (or an indicia thereof, by way of example, a rotational speed of a rotational member within a segment of conduit). Other embodiments of leak detectors, flow-rate sensors, flow-path isolators, methods, circuits and/or control systems than those described above in detail are contemplated based on the principles disclosed herein, together with any attendant changes in configurations of the respective apparatus and/or circuits described herein. Incorporating the principles disclosed herein, it is possible to provide a wide variety of control systems configured to issue an alert or other command, and/or, based on a detected change in state or operation (e.g., a detected leak or change in observed flow rate), to adjust an operation of a wide variety of systems, including by way of example, a heat-transfer system for any of a data center, a laser component, a light-emitting diode, a chemical reactor, photovoltaic cells, solar collectors, and a variety of other industrial, military and consumer devices now known and hereafter developed. Moreover, systems disclosed above can be used in combination with other liquid-based systems including, inter alia, reactor vessels.

Although the discussion of couplers presented herein pertains to fluid couplers, those of ordinary skill in the art will appreciate following a review of this disclosure that the innovative principles disclosed in relation to fluid couplers can be readily applied to other forms of couplers, including electrical couplers, pneumatic couplers, optical couplers, etc.

Directions and references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by references in its entirety for all purposes.

The principles described above in connection with any particular example can be combined with the principles described in connection with any one or more of the other examples. Accordingly, this detailed description shall not be construed in a limiting sense, and following a review of this disclosure, those of ordinary skill in the art will appreciate the wide variety of fluid heat exchange systems that can be devised using the various concepts described herein. Moreover, those of ordinary skill in the art will appreciate that the exemplary embodiments disclosed herein can be adapted to various configurations without departing from the disclosed principles.

The previous description of the disclosed embodiments is provided to enable any person skilled in the art to make or use the disclosed innovations. Those of ordinary skill in the art will appreciate that the exemplary embodiments disclosed herein can be adapted to various configurations and/or uses without departing from the disclosed principles. For example, the principles described above in connection with any particular example can be combined with the principles described in connection with another example described herein. Various modifications to those embodiments will be readily apparent to those skilled in the art, and the generic principles defined herein may be applied to other embodiments without departing from the spirit or scope of this disclosure. Accordingly, this detailed description shall not be construed in a limiting sense, and following a review of this disclosure, those of ordinary skill in the art will appreciate the wide variety of filtering and computational techniques can be devised using the various concepts described herein.

Similarly, the presently claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

Thus, in view of the many possible embodiments to which the disclosed principles can be applied, we reserve the right to claim any and all combinations of features described herein, including the right to claim all that comes within the scope and spirit of the foregoing description, as well as the combinations recited in the claims below and presented anytime throughout prosecution of this application, literally and equivalently.

We presently claim:

1. A cooling system, comprising:
a sensor circuit configured to emit a simulated signal corresponding to a selected physical parameter as a proxy for an observed operational parameter different from the selected physical parameter;
a controller configured to receive the simulated signal and to infer a state of the observed operational parameter from the simulated signal, the controller being configured to emit a control signal over a communication connection in response to the inferred a state of the observed operational parameter being within a selected range; and
a branch of a cooling circuit having an inlet, an outlet and a heat exchanger configured to transfer heat to or from a liquid coolant flowing from the inlet, through the heat exchanger and to the outlet, the inlet having a liquid coupler configured to mechanically couple the inlet with a coolant supply, wherein the liquid coupler fluidically couples the inlet to a conduit containing coolant while the liquid coupler is mechanically coupled with the coolant supply and isolates the inlet from the conduit when the liquid coupler is mechanically decoupled from the coolant supply; and
an electro-mechanical actuator communicatively coupled with the controller to receive the control signal over the communication connection, the electro-mechanical actuator configured to mechanically decouple the liquid coupler from the coolant supply responsive to the control signal.

2. The cooling system according to claim 1, wherein the liquid coupler comprises a retainer movable between a first position and a second position, the retainer being in the first position when the liquid coupler mechanically couples with the coolant supply, wherein the liquid coupler mechanically decouples from the liquid supply when the retainer is in the second position.

3. The cooling system according to claim 2, wherein the electro-mechanical actuator comprises a control arm movable between a first extent and a second extent responsive to the control signal.

4. The cooling system according to claim 3, wherein movement of the control arm toward the second extent urges the retainer toward the second position.

5. The cooling system according to claim 1, wherein the electro-mechanical actuator comprises a servo motor, a stepper motor, or both.

6. The cooling system according to claim 1, wherein the liquid coupler comprises a biasing member configured to urge the liquid coupler away from the liquid supply, the cooling system further comprising a movable retainer mechanically coupled with the liquid coupler, the retainer being movable between a retention position and a release position, wherein, in the retention position, the retainer causes the liquid coupler to engage with the coolant supply, wherein the biasing member causes the liquid coupler to disengage from the coolant supply when the retainer is in the release position.

7. The cooling system according to claim 6, further comprising a control arm mechanically coupling the electro-mechanical actuator with the retainer, wherein movement of the control arm from a first extent to a second extent urges the retainer to move from the retention position to the release position.

8. The cooling system according to claim 7, wherein the electro-mechanical actuator comprises a servo motor, a stepper motor, or both, configured to urge the control arm to move toward the second extent from the first extent.

9. The cooling system according to claim 6, wherein the electro-mechanical actuator is configured to urge the retainer toward the release position from the retention position.

10. The cooling system according to claim 9, wherein the electro-mechanical actuator is configured to move the retainer into the release position from the retention position.

11. The cooling system according to claim 10, wherein movement of the retainer into the release position by the electro-mechanical actuator allows the biasing member to cause the liquid coupler to physically disengage from the coolant supply.

12. The cooling system according to claim 10, wherein the liquid coupler is configured to automatically disengage from the coolant supply when the electro-mechanical actuator moves the retainer into the release position.

13. The cooling system according to claim 1, wherein the sensor circuit comprises a leak detection circuit.

\* \* \* \* \*